United States Patent [19]

Oakes

[11] 4,209,258

[45] Jun. 24, 1980

[54] AUTOMATIC CONTINUOUS MIXER APPARATUS

[76] Inventor: W. Peter Oakes, 296 Maple St., Islip, N.Y. 11751

[21] Appl. No.: 877,679

[22] Filed: Feb. 14, 1978

[51] Int. Cl.$^2$ .......................................... B01F 15/04
[52] U.S. Cl. .................................... 366/138; 137/98; 366/142; 366/152; 366/161; 417/43; 422/111
[58] Field of Search ............... 366/132, 134, 138, 140, 366/142, 150, 161; 137/98, 101.19; 417/43, 2; 422/62, 110, 111, 105, 116

[56] References Cited

U.S. PATENT DOCUMENTS

| | | | |
|---|---|---|---|
| 3,067,987 | 12/1962 | Ballou | 366/161 |
| 3,495,808 | 2/1970 | Klein | 366/138 |
| 3,606,903 | 9/1971 | Porter | 137/101.19 |
| 3,794,301 | 2/1974 | Simmonds | 366/132 |

Primary Examiner—Robert W. Jenkins
Attorney, Agent, or Firm—Brumbaugh, Graves, Donohue & Raymond

[57] ABSTRACT

Mixing apparatus comprises a continuous mixer supplied with ingredients by a plurality of speed controlled motor driven pumps and having flow meters providing signals representative of ingredient flow rates. A programmed digital computer controls the pump motors in response to any differences between actual flow rates and selected reference flow rates so as to maintain the actual flow rates substantially at the reference values. The reference values are set into thumb wheel switches on a control panel having devices for displaying the actual flow rates or the errors between the actual and the set-in rates, and a plurality of switches selectively settable to establish the mode of operation of the apparatus. The computer periodically determines the set-in flow rates and the switch settings and updates the information displayed on the panel. The computer also detects the occurrence of malfunctions and initiates actions to warn the operator thereof and to shut down the apparatus automatically if required remedial action is not taken by the operator in time.

25 Claims, 21 Drawing Figures

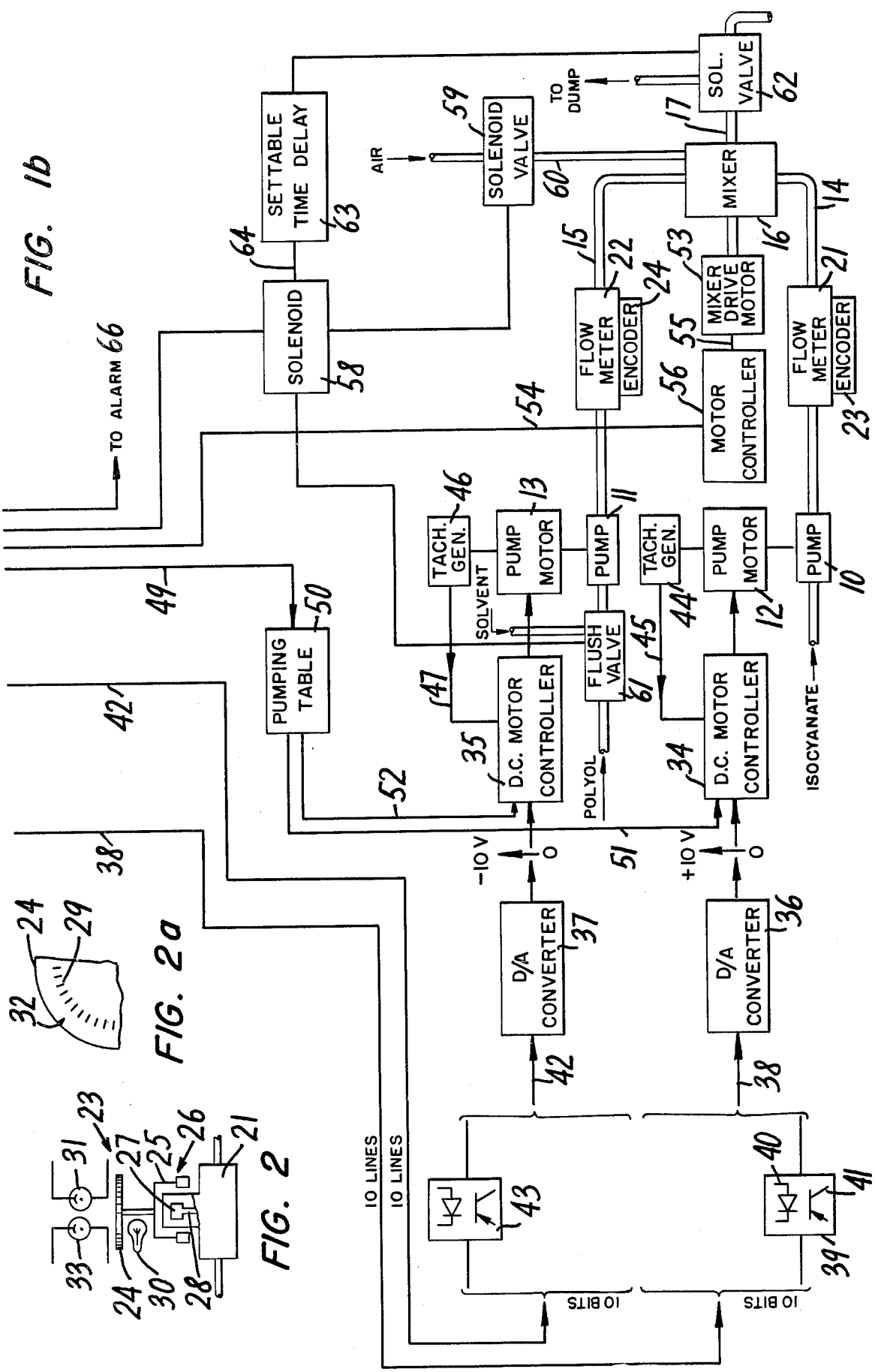

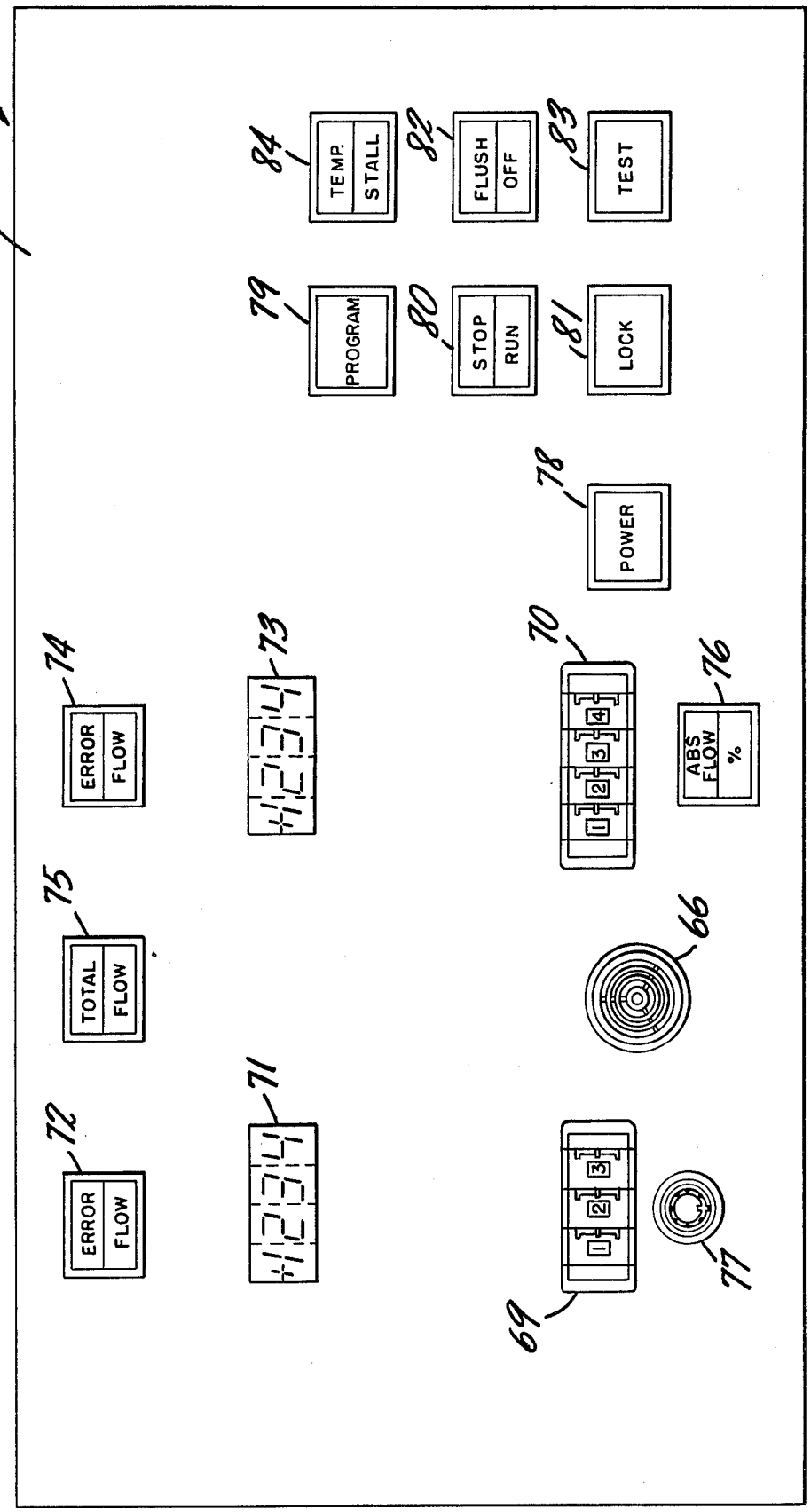

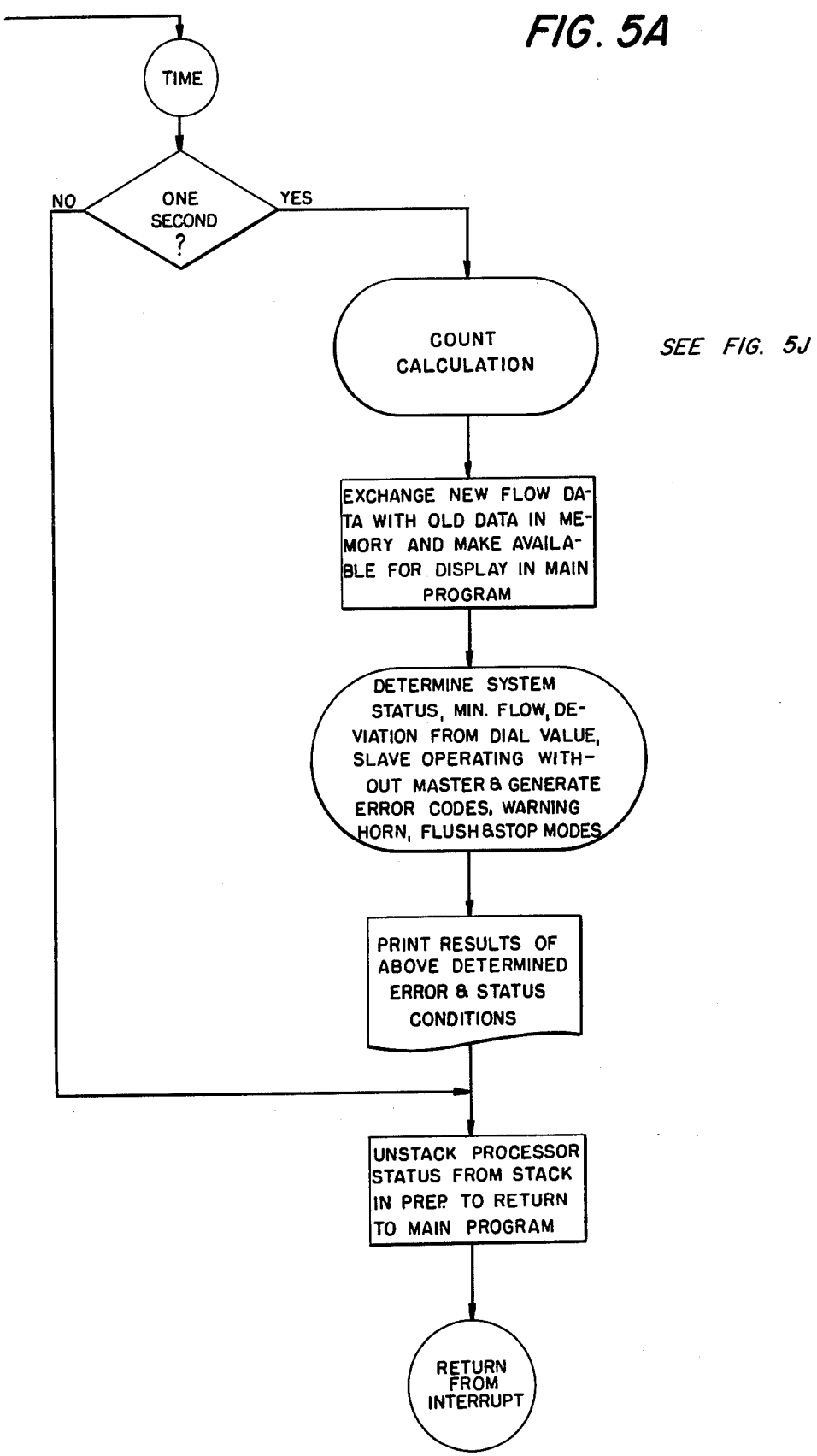

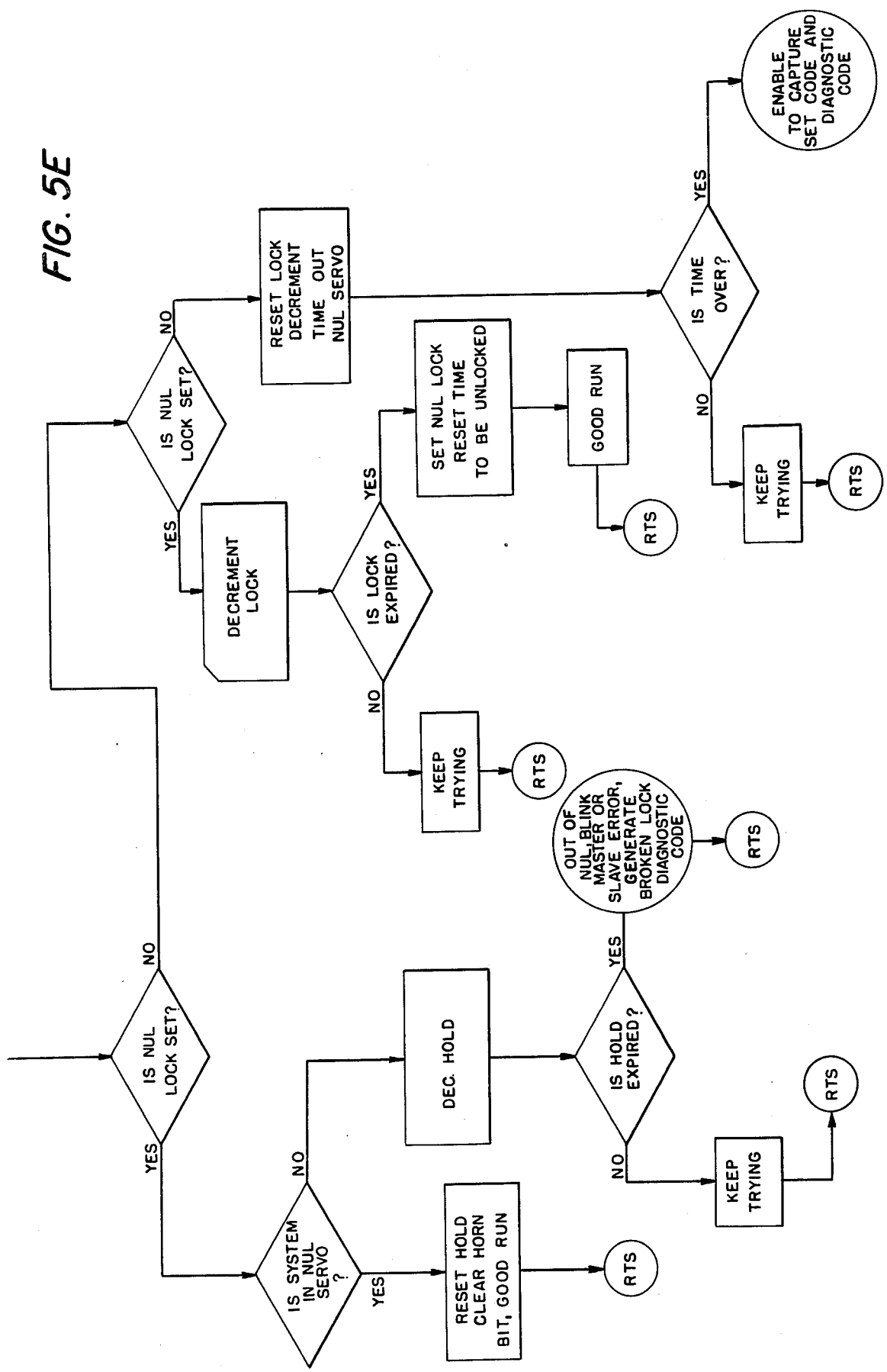

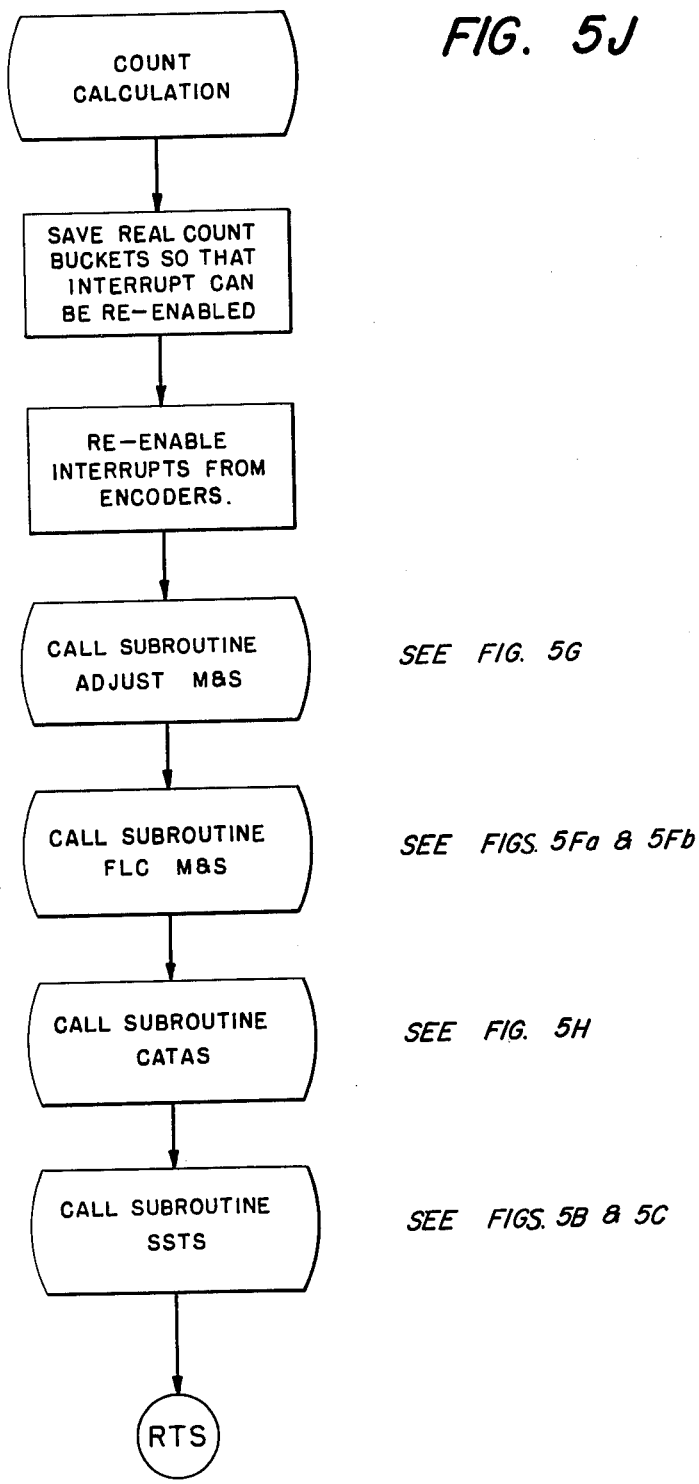

AUTOMATIC CONTINUOUS MIXER APPARATUS

BACKGROUND OF THE INVENTION

This invention relates to mixing apparatus and more particularly to a new and improved continuous mixer which is capable of mixing a plurality of liquid ingredients in accurately maintained proportions, together with air, in a highly effective manner, to form a product of exceptional uniformity.

In manufacturing operations, it is often necessary to mix a plurality of liquid ingredients in accurately maintained proportions in order to make a desired product. For example, rigid polyurethane foams are made by interacting isocyanate and polyol in specified proportions in suitable mixing apparatus. Although attempts have been made heretofore to automate such processes by controlling the pumps supplying the ingredients to the mixer in response to sensed flow rates of the ingredients and specified values, the results have not been satisfactory. Such systems as have been devised have been based on analog signal control and have lacked the very high degree of accuracy and resolution required. Also, they have not been able readily to accommodate changes in throughput without substantial readjustment, and they have either been slow or unstable in effecting necessary corrections in flow rates as required.

It is an object of the invention, accordingly, to provide new and improved automatic continuous mixing apparatus that is substantially free from the above noted deficiencies of the prior art.

Another object of the invention is to provide new and improved mixing apparatus of the above character that is capable of maintaining the ingredient flow rates at specified values to a high degree of accuracy and resolution.

A further object of the invention is to provide new and improved mixing apparatus of the above character which is adapted to effect necessary corrections in ingredient flow rates in a rapid and stable manner.

Still another objective of the invention is to provide new and improved mixing apparatus of the above character in which the throughput can be adjusted without requiring separate adjustment of the set-in ingredient flow rates.

Yet another object of the invention is to provide new and improved mixing apparatus of the above character which includes means for rapidly detecting unfavorable or hazardous operating conditions and promptly signalling their existence to an operator, and, in case no remedial action is taken within a predetermined time interval, for automatically initiating remedial action if required.

SUMMARY OF THE INVENTION

Mixing apparatus according to the invention comprises a continuous mixer to which a plurality of ingredients are supplied by a plurality of speed controlled, motor driven pumps. The flow rates of the ingredients are sensed by flow meters, respectively, to provide digital signals that are compared with reference flow rate values to provide error signals that control the pump motors so as to maintain the actual ingredient flow rates substantially at the reference values. Fine and coarse rate correction means responsive, respectively, to small and large error signals effect correction of the flow rates rapidly and without hunting.

The reference flow rates are set into the apparatus by means mounted on a panel which also has means for displaying the actual flow rates or the error between the actual and reference flow rates, together with a plurality of switches selectively settable by an operator to condition the operation of the apparatus, and signal means providing visual indications of the set conditions.

Periodically, say once a second, a programmed digital computer scans the set-in flow rates and the switch settings on the panel and updates the displays on the panel. The computer also stores the signals sensed by the flow meters during each one-second interval and compares them with the set-in values to produce error signals representative of the differences between the actual flow rates and the set-in values. From these error signals, the computer initiates action to change the speeds of the pump motors to reduce the differences between the actual and the set-in flow rates substantially at zero.

In the event an unfavorable operating condition should develop, it is sensed by the computer which initiates action to warn an operator of the condition, and, if no action is taken to alleviate the condition within a specified time, it acts to shut down the system in accordance with a prearranged schedule.

DESCRIPTION OF A PREFERRED EMBODIMENT

The invention may be better understood from the following detailed description of a representative embodiment taken in conjunction with the accompanying drawings in which:

FIGS. 1a and 1b taken together illustrate schematically mixing apparatus constructed according to the invention;

FIGS. 2 and 2a illustrate details of a flow meter encoder used in the apparatus of FIG. 1;

FIG. 3 is a schematic diagram of the control panel for the apparatus of FIGS. 1a and 1b;

Figure 5:
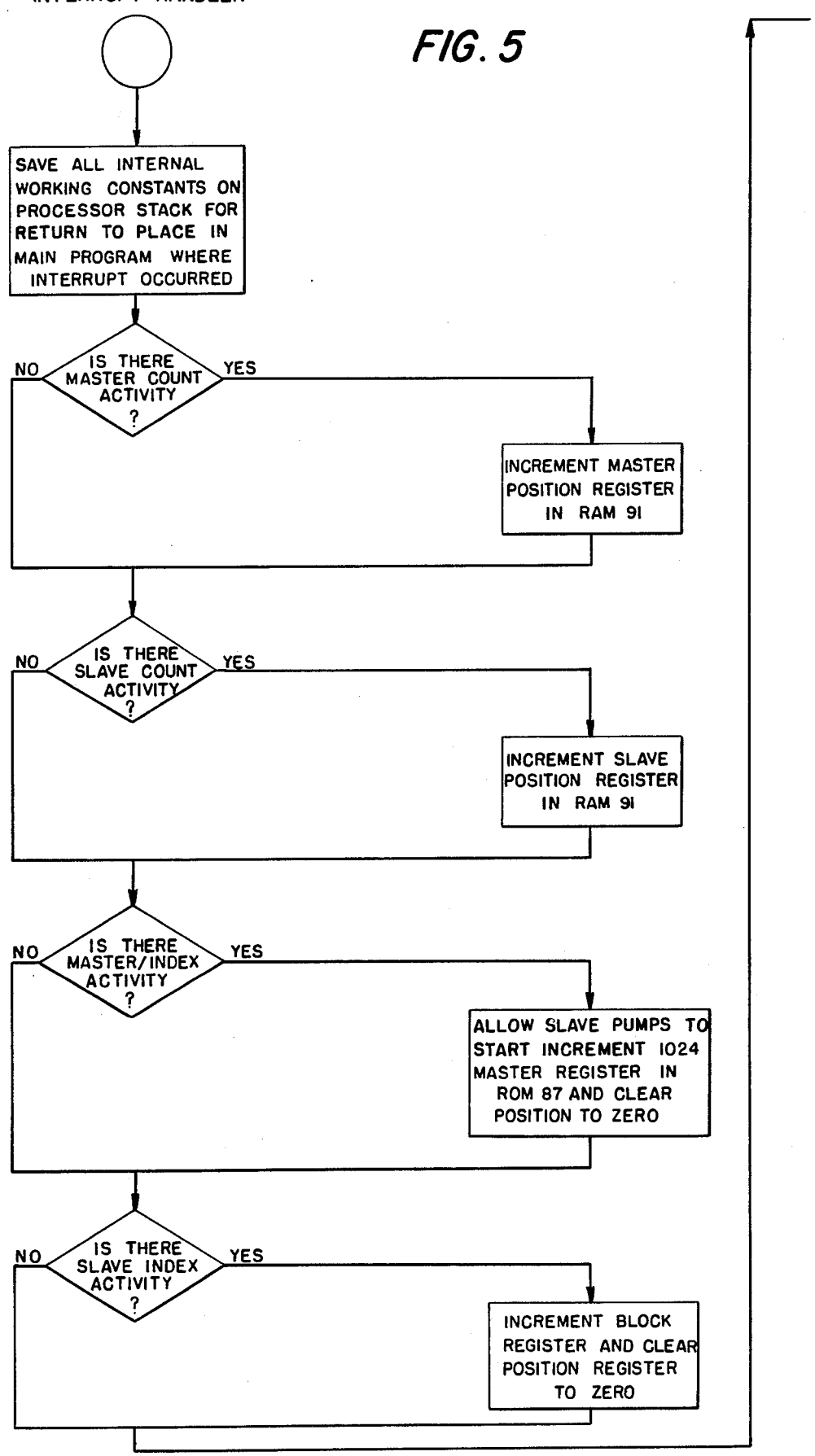
FIGS. 5 and 5A show different portions of the "Interrupt Sequence" program pursuant to which interrupts are serviced.
Figure 5B:
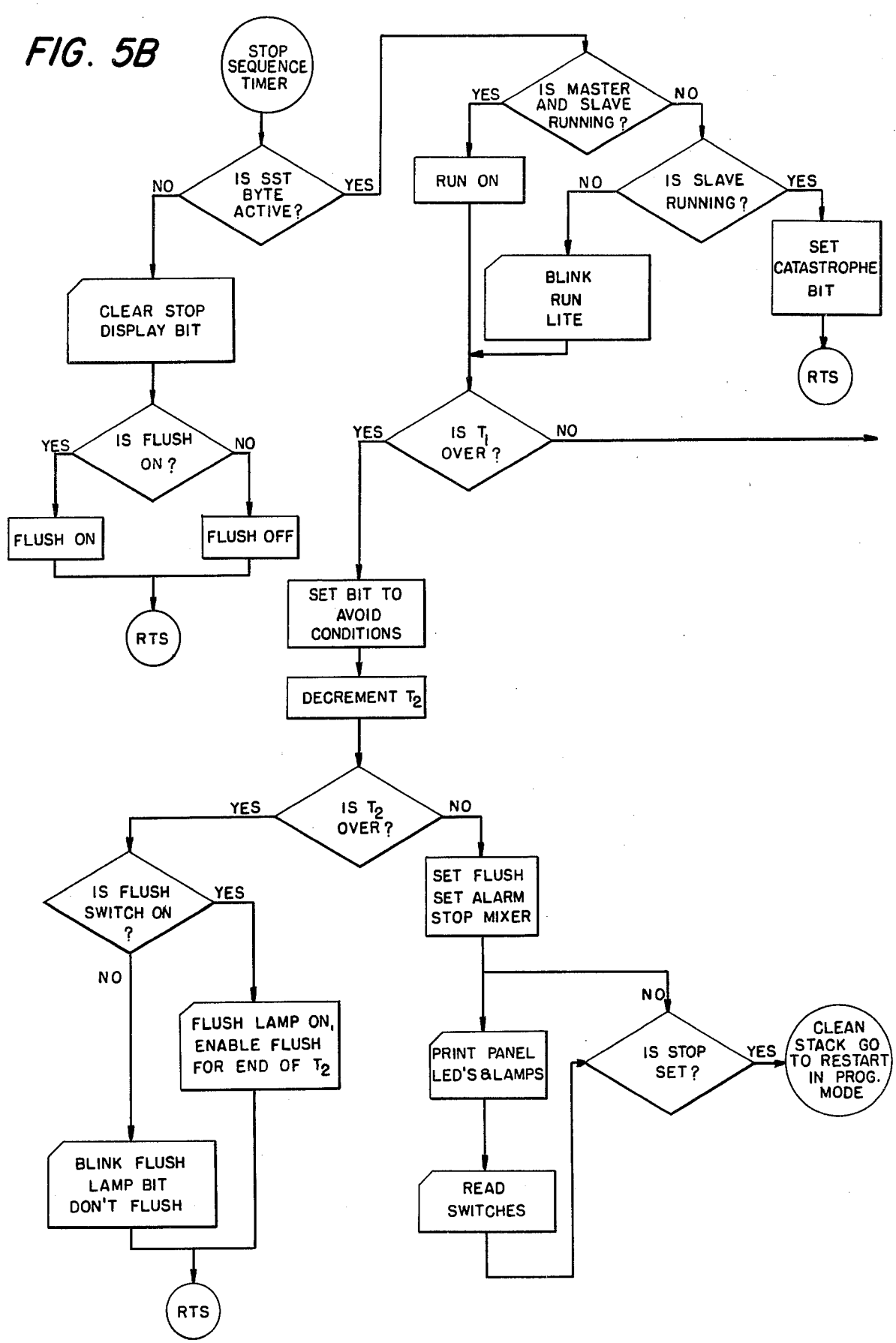
FIGS. 5B and 5C are typical flow diagrams of the "Stop Sequence Timer" subroutine.
Figure 5C:
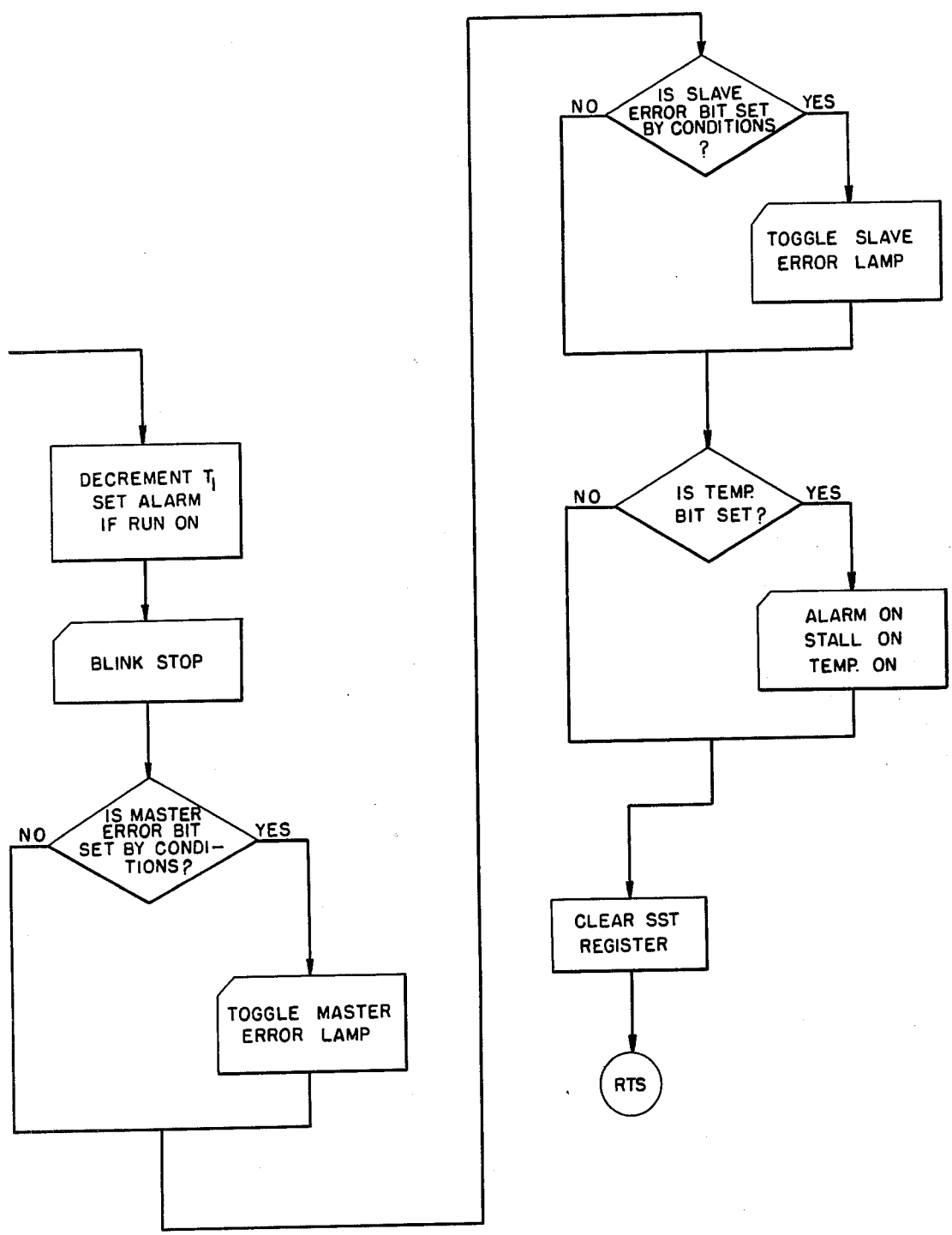
Figure 5D:
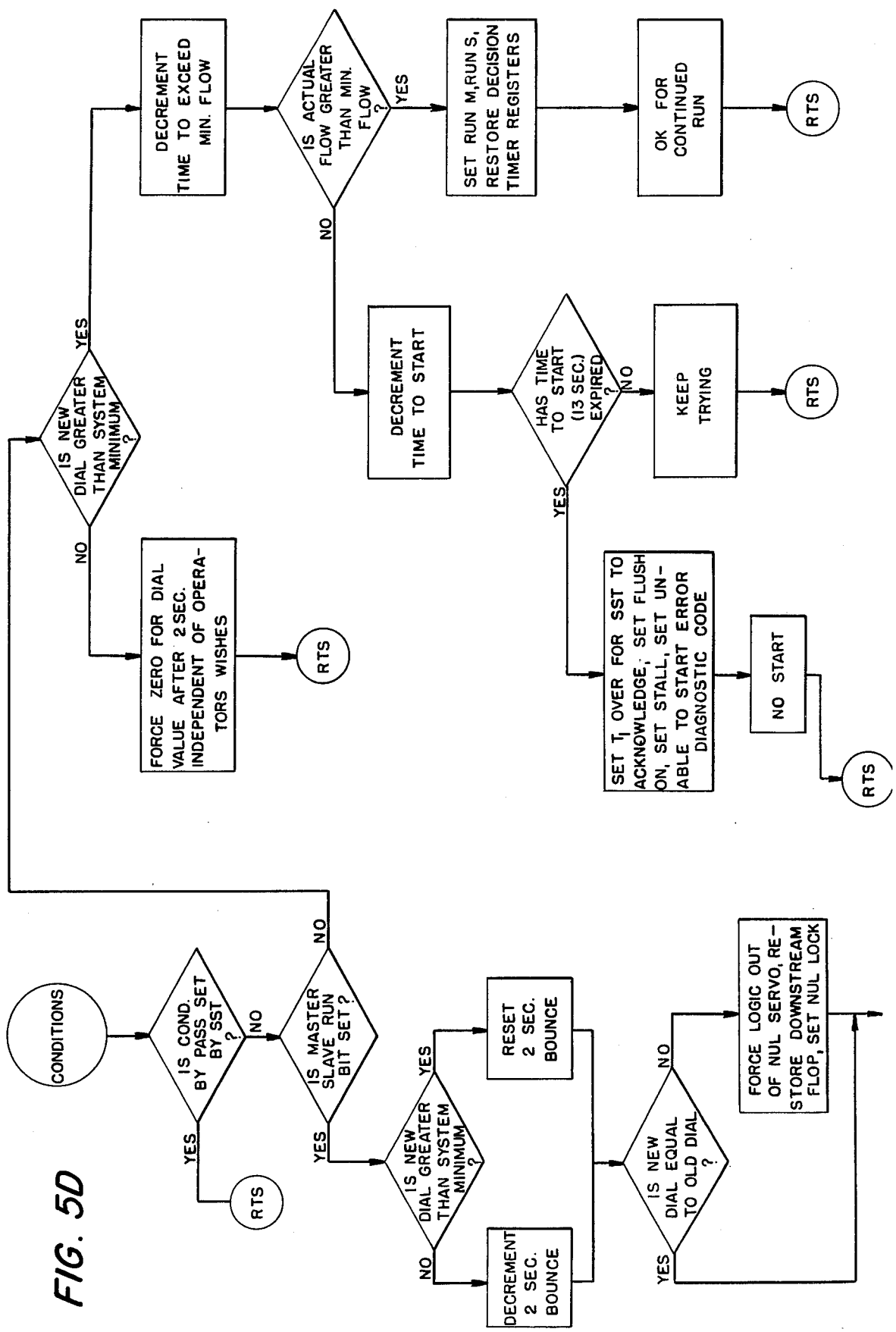
FIGS. 5D and 5E are typical flow diagrams of the "Conditions" program subroutine.
Figure 5F:
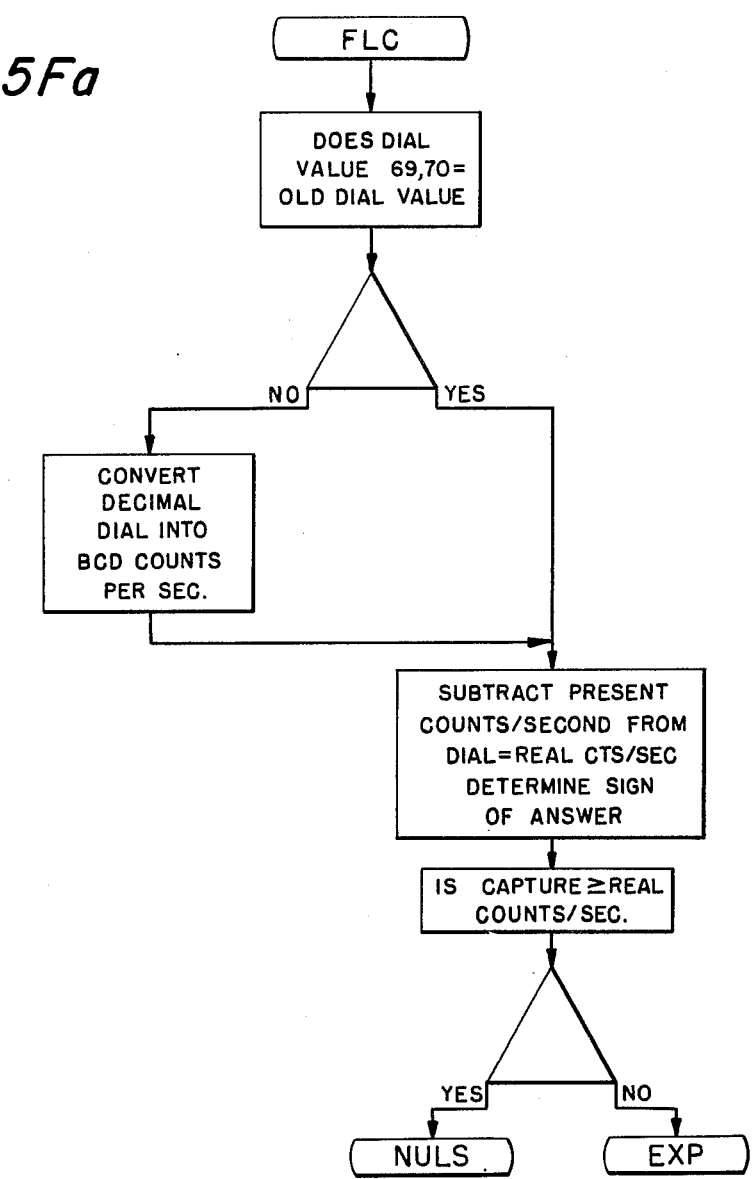
Figure 6:
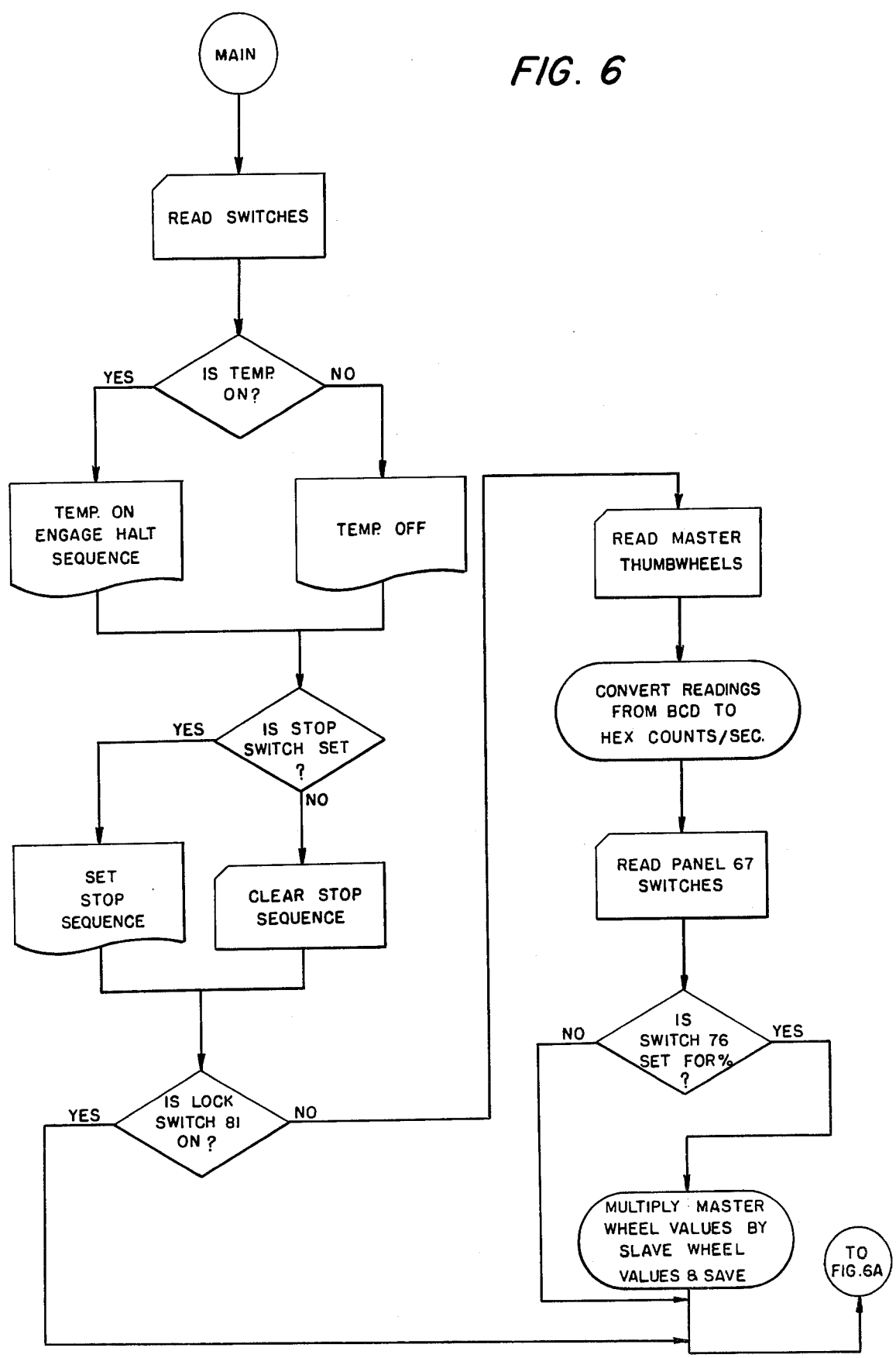
Figure 6A:
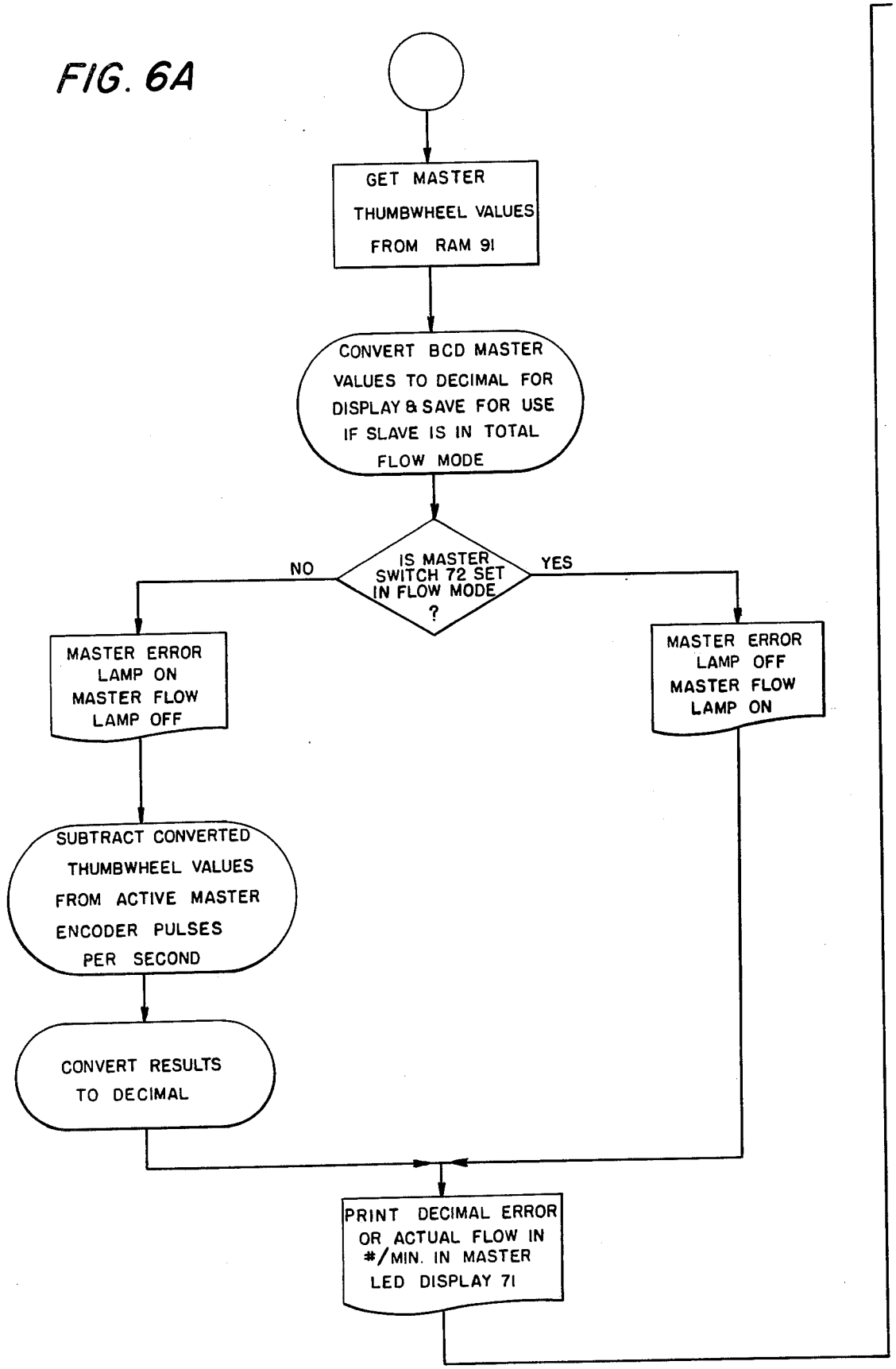
Figure 6B:
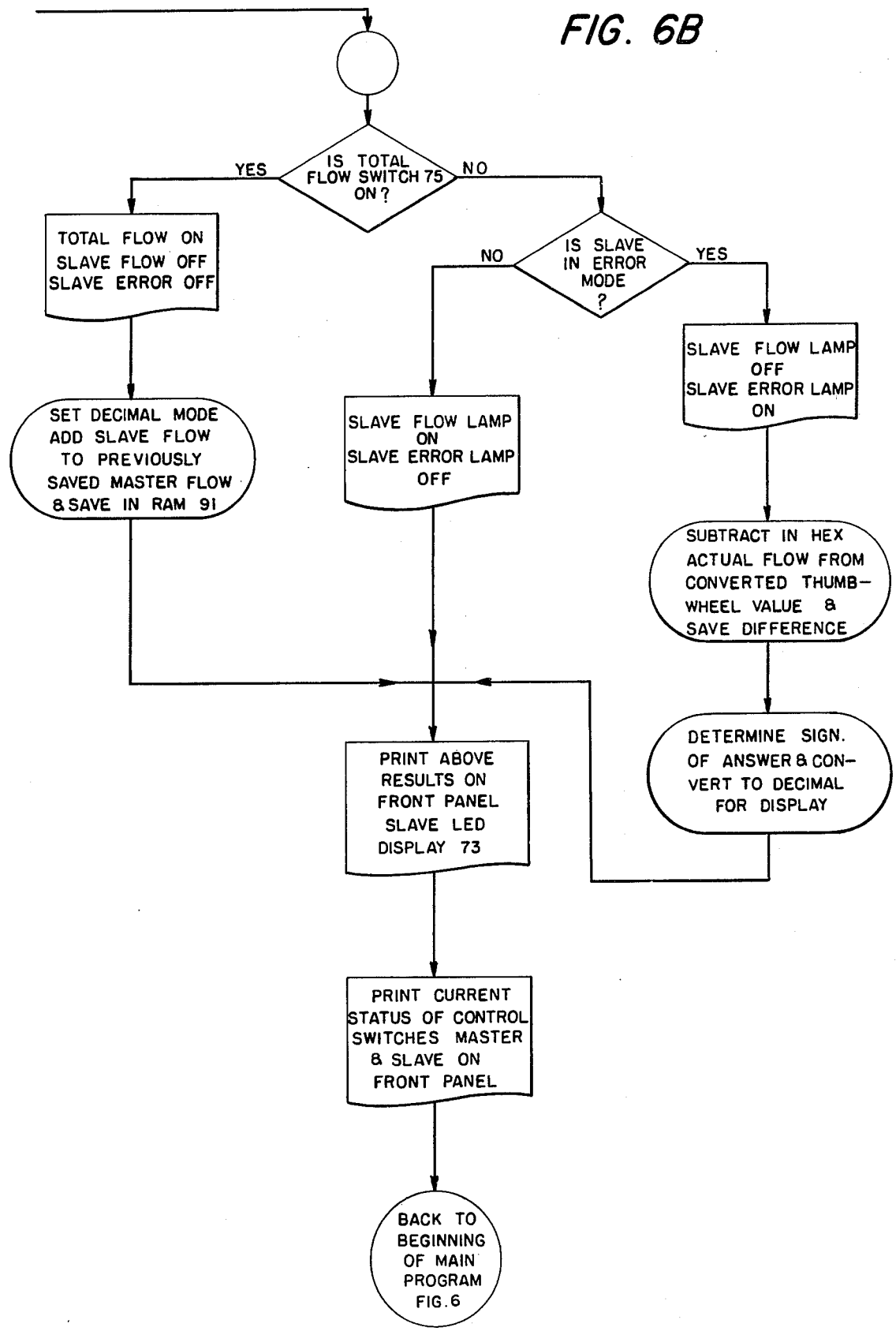

FIGS. 5Fa and 5Fb, 5G, 5H and 5J are typical flow diagrams of the "Flow Rate Control," "Adjust," "Catastrophe" and "Count Calculation" program subroutines, respectively;

FIGS. 6, 6A and 6B taken together illustrate parts of the main program pursuant to which the system is controlled.

For purposes of illustration, the invention will be described as applied to a conventional process for mixing polyol and isocyanate in accurately measured proportions to produce polyurethane foam. Apparatus suitable for carrying out the process comprises a pair of gear pumps 10 and 11 (FIG. 1b) driven by controllable speed motors 12 and 13, respectively, to supply isocyanate and polyol through conduits 14 and 15, respectively, to a conventional mixer 16. Preferably, the mixer is of the type shown in U.S. Pat. No. 3,081,069 which is adapted to subject material passing therethrough to a uniform mixing, kneading and stirring operation and to discharge polyurethane therefrom through an outlet 17.

The isocyanate pump may be a conventional gear pump 10, and if the polyol is loaded with finely divided filler material, as is often the case, the pump 11 may be a conventional screw-type pump.

The flow rates of isocyanate and polyol in the conduits 14 and 15, respectively, are accurately measured by flow meters 21 and 22, respectively. The flow meter 21 may be a conventional circular gear type flow meter but it is preferred that the flow meter 22 be a conventional oval gear flow meter if the polyol contains a filler. The mechanical outputs of the flow meters 21 and 22 are converted to electric signals by the encoders 23 and 24, respectively, which are substantially identical in construction so that it will be necessary to describe only one of them in detail.

As shown in FIGS. 2 and 2a, the encoder 23 comprises a transparent disc 24 mechanically coupled to one element 25 of a magnetic clutch 26, the driving element 27 of which is connected to the output shaft 28 of the flow meter 21 inside the housing of the latter. The disc 24 has formed thereon a ring of equally spaced, radial index marks 29 interposed in the path of light from a lamp 30 to a photocell 31. Conveniently, the index marks 29 may be 1024 in number so as to produce 1024 output pulses from the photocell 31 for each revolution of the disc 24.

The disc 24 also has a single index mark 32 spaced radially away from the ring of marks 29. The mark 32 is adapted to interrupt light from the lamp 30 falling on a second photocell 33 so as to produce an output signal pulse from the latter once for each revolution of the disc 24. The position of the index mark 32 is so chosen that it produces an index pulse when the gears of the flow meter 21 are in a reference relation, e.g., when the minor axis of the output gear is in alignment with the major axis of the gear with which it is engaged.

Since the flow meter 21 is essentially a circular gear pump, a constant rate of flow therethrough will result in the production by the encoder photocell 31 of a series of equally spaced apart pulses and the pulse rate will be proportional to the rate of flow through the pipe 14. The flow meter 22 being of the oval gear type, however, the pulse output of its encoder 24 for any given constant flow rate will be modulated as a function of the periodically varying speed of rotation of the flow meter output shaft which goes through two maxima and two minima per shaft revolution.

The pulse outputs of the encoders 23 and 24 are supplied to a programmed computer 25 (FIG. 1a) where they are periodically compared with signals representative of preset flow rates for the materials in the pipes 14 and 15, respectively. From the comparison, error signals are produced for controlling the energization of the motors 12 and 13 to adjust the speeds of the latter to match the actual flow rates in the pipes 14 and 15 to the preset values, as described in greater detail below. To this end, the motors 12 and 13 may be conventional D.C. motors connected to be energized by conventional D.C. motor controllers 34 and 35, respectively, powered by alternating current from the mains and controlled by D.C. signal supplied by conventional digital to analog converters 36 and 37, respectively.

As described below, the computer 25 (FIG. 1a) generates two ten bit words for controlling the motors 12 and 13. The ten bit word for controlling the speed of the motor 12 is supplied from ten conventional latches 36a to the converter 36 over the conductive path 38. In order to isolate the motor control system noise and voltage from the computer 25, each bit of the power word is transmitted through an optoisolator 39 comprising a light-tight housing containing a light emitting diode 40 disposed to direct light to a phototransistor 41.

Similarly, the ten bit word for controlling the speed of the motor 13 passes from ten conventional latches 37a to the converter 37 over the conductive path 42 and there is an optoisolator 43 like the optoisolator 39 in each separate bit path for isolation purposes.

The digital to analog converters 36 and 37 are of conventional type and for a ten bit input representing a total count of 1024, they may both be adjusted so that when all bits are on, the analog output is 10.24 volts. The analog outputs from the converters, which are D.C. voltages ranging from zero to 10.24 volts, are input to the D.C. controllers 34 and 35 which control the speed of the motors 12 and 13. In practice, the relation between the control voltage and the motor speed is substantially linear from zero to maximum speed.

In order to render the control more rapid and less sensitive to pump head pressure changes and motor torque changes, it is desirable to provide a secondary feedback loop within each of the master motor control loops. Such feedback loop for the motor 12 may comprise, for example, a conventional tachometer generator 44 mounted on the motor shaft and having a generated D.C. voltage-motor speed relation essentially matching the relation between the control voltage applied to the controller 34 and the motor speed. The generated voltage is fed from the generator 44 through a conductor 45 to the controller 34 where it is compared with the input control voltage to produce an error signal for quickly bringing the motor speed to the value called for by the control voltage.

Similarly, a tachometer generator 46 on the shaft of the motor 13 generates a D.C. voltage proportional to speed which is fed to the controller 35 through a conductor 47 and functions in like manner to bring the motor speed quickly to the value called for by the control voltage supplied to the controller 35.

Figure 1A:
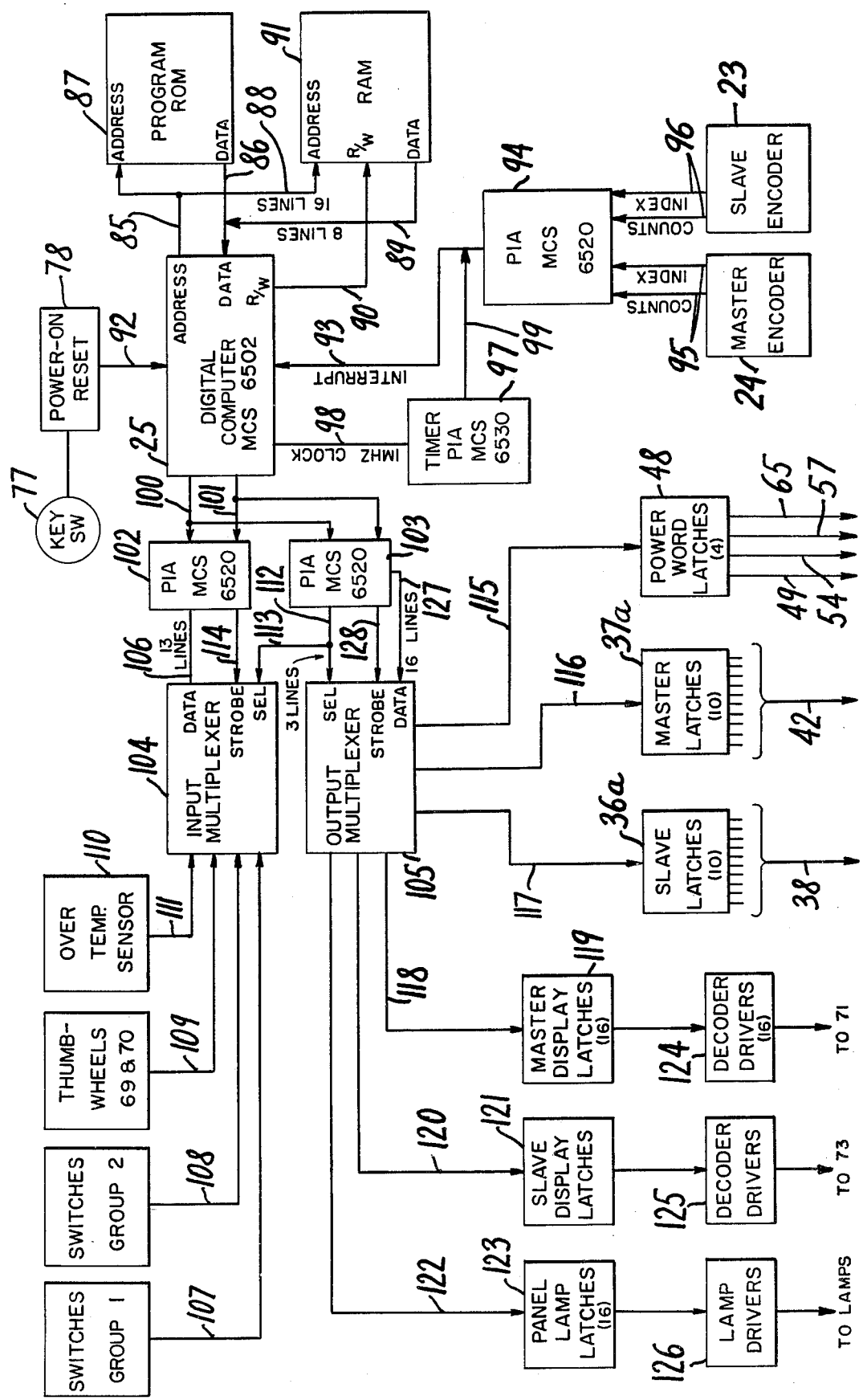

The computer 25 (FIG. 1a) in response to operator control or operating conditions as described below also generates a four bit power word which appears at four latches 48 (FIGS. 1a and 1b). One bit of the power word is supplied through a line 49 to a pump control 50 which turns the pump motors 12 and 13 on or off by signals supplied through the lines 51 and 52 to the motor controllers 34 and 35, respectively.

A second bit of the power word turns the mixer motor 53 on or off through the lines 54 and 55 and a motor control 56.

A third bit of the power word is used to initiate or terminate a flushing operation in which a solvent is pumped into the mixer to flush it out. To this end, the third bit is transmitted over the line 57 to a solenoid 58 which controls a solenoid valve 59 in an air line 60 to the mixer 16, a solenoid valve 61 in the conduit 15 to the pump 11 which can be positioned to supply selectively to the pump 11 either polyol or a solvent, and a solenoid valve 62 in the discharge conduit 17 from the mixer 16 which, when energized, diverts the output from the mixer 16 to a dump receptacle (not shown). A conventional time delay circuit 63 in the line 64 maintains the value 62 in the diverted position for a predetermined settable time after initiation by the solenoid 58.

The fourth bit of the power word is supplied over a line 65 to an alarm device 66 such as a horn mounted on a control panel 67 (FIG. 3) on a cabinet 68 which may contain the computer.

The Control Panel

Referring now to FIG. 3, the desired flow rates for the polyol and isocyanate which are to be maintained are entered into manually settable thumb wheel switches 69 and 70 respectively, on the control panel 67. The thumb wheel switch 69 has three segments to accommodate numbers up to 999 and it is adapted to provide a binary coded decimal output representative of its setting. The thumb wheel switch 70 is similar to the switch 69 but it has four segments so that it can accommodate numbers up to 199.9.

Above the thumb wheel switch 69 is a four digit, light emitting diode (LED) display device 71 capable of displaying positive or negative numbers up to 1999. The display device 71 is adapted to display either the actual polyol flow rate, or the error flow rate (the difference between the actual and preset flow rates), depending upon the position of a switch 72. The switch 72 is an illuminated, latching, push-button switch which, on successive actuations, connects the display device 71 to display the polyol flow rate or the error flow rate and causes only the applicable legend "FLOW" or "ERROR" to be illuminated.

In similar fashion, or four digit display device 73 and an illuminated, latching, push-button switch 74 are located above the thumb wheel switch 70. The switch 74, on successive actuations, is adapted to connect the display device 73 to display either the isocyanate flow rate or the error flow rate and to cause only the applicable legend "ERROR" or "FLOW" to be illuminated.

Between the switches 72 and 74 is a third illuminated, latching, push-button switch 75, which, when actuated, overrides the switch 74 and connects the display device 73 to display the actual total flow rate, i.e., the sum of the actual polyol and isocyanate flow rates. At the same time it extinguishes the legends on the switch 74 and illuminates the legend "TOTAL FLOW" on the switch 75.

Below the thumb wheel switch 70 is an illuminated, latching, push-button switch 76 which, on successive actuations, connects the thumb wheel switch 70 to represent either the absolute isocyanate flow rate or the isocyanate flow rate as a percentage of the polyol flow rate. The switch 76 also illuminates the appropriate legend "FLOW" or "%". When in the "%", mode, the isocyanate channel is, in effect, slaved to the polyol channel so that the system throughput can be increased or decreased merely by adjusting the polyol thumb wheel switch 69.

Below the polyol thumb wheel switch 69 is a key switch 77 which, in the event of any difficulty due to transients or the like, can be actuated to cause the computer 25 (FIG. 1a) to clear itself and start over.

Power to the entire system is turned on and off by successively actuating an illuminated, latching, push-button switch 78, the appropriate legend "POWER" being illuminated when the switch is in the on position.

On the right-hand side of the front panel are two groups of illuminated, latching, push-button switches 79 through 82 labeled "PROGRAM", "STOP/RUN", "LOCK", and "FLUSH/OFF", respectively, an illuminated momentary test button 83 labeled "TEST", and a "TEMP/STALL" indicator 84.

The "PROGRAM" switch 79 is used before the system is started to set two decimal numbers representing time intervals into a register in a random access memory (RAM) associated with the computer. One of these numbers determines the period of time that the system will operate without going into a "FLUSH" mode (described below) after some malfunction other than a catastrophic malfunction has been detected. This time interval, which may be in the range from 1 to 99 seconds, is set into a random access memory (RAM) associated with the computer 25 by depressing the "PROGRAM" and "LOCK" push-button 79 and 81 when the computer 25 is in the "STOP" condition, and setting the two left-hand digits of the polyol thumb wheel switch 69 to the desired number of seconds, as described in greater detail below.

The second time representing decimal number determines how long the "FLUSH" mode is to continue after it has been initiated. The operator sets this number into the RAM associated with the computer 25 by adjusting the two right-hand digits of the thumb wheel switch 70 to the desired value while the "PROGRAM" and "LOCK" push-buttons 79 and 81 are depressed and the computer is in the "STOP" condition. After the two time intervals have been set, the "LOCK" and "PROGRAM" push-buttons are depressed a second time to disconnect the thumb wheel switches 69 and 70 from the time setting functions so that they can be set to the desired flow rates for the ingredients.

The "STOP/RUN" push-button 80, when actuated, initiates the start or stop of the computer. When in the stop position, the "STOP" light is illuminated, and in the run position the "RUN" light is illuminated.

When the "LOCK" push-button 81 is depressed, it locks out the thumb wheel switches 69 and 70 and all of the control switches on the panel 67, so that even if changes are made, the system will not respond to them but will continue to run as it was prior to actuation of the "LOCK" button. By actuating this button, the operator can set in entirely new values corresponding to different operating conditions while the system is running. The "LOCK" button can then be released sometime later, to cause the system immediately to go to the new preset values and operate thereafter in the manner determined thereby.

The element 84 labeled "TEMP/STALL" is an indicator indicating above normal rise in temperature in the mixer 16 (FIG. 1b) as determined by a sensor 110 (FIG. 1c) therein. When the maximum allowable temperature is exceeded, the legend "TEMP" will be illuminated and, if no corrective action is taken during a set period of time, action will be taken automatically to shut down the system as described below. When that occurs, the legend "STALL" is also illuminated and remains illuminated after the system is shut down, indicating to the operator the reason for the shut-down.

The "FLUSH/OFF" push-button switch 82 enables the operator to override the "FLUSH" sequence. When actuated, it prevents the computer 25 from initiating action to flush the ingredients out of the mixer although such action may be called for. In such case, the light illuminating the legend "FLUSH" will blink, informing the operator that the mixer is not being flushed, although the computer is calling for such action. The "OFF" light is illuminated any time the system comes to a stop.

The push-button 83 labeled "TEST", when actuated, simply illuminated all of the lights on the front panel and illuminates all of the segments of the display devices so that the operator can quickly ascertain if they are all in operating condition.

The Flow Control System

The flow control system includes a conventional computer 25 (FIG. 1a) which may be a model MCS 6502 microcomputer. The structure and operation of this computer are set forth in detail in the manual for this model published by MOS Technology, Inc., 950 Rittenhouse Road, Norristown, Pa. 19401, together with detailed instructions for programming it to perform functions of the kind here involved.

The computer 25 has address and data lines 85 and 86, respectively, communicating with a read-only memory (ROM) 87 containing the control program; and address, data and read/write (R/W) lines 88, 89 and 90 communicating with a random access memory (RAM) 91 which serves as the internal memory for the computer. The computer also has a reset line 92 which communicates with the "POWER" switch 78 and the reset key switch 77 (FIG. 3) for automatically resetting the computer 25 to start part of the program when either switch is actuated.

The computer 25 also has an interrupt line 93 communicating with a conventional type MCS 6520 peripheral interface adapter (PIA) 94 which continuously receives an index pulse and other flow representative pulses from each of the encoders 23 and 24, respectively, through the lines 95 and 96, respectively. Each of these pulses is transmitted to the computer 25 as an interrupt.

A type MCS 6530 timer 97 receives over a line 98 the output of the computer's internal clock which may be operating at a frequency of, say, 1 Mhz/sec., and supplies one second interrupt signals to the computer 25 over the lines 99 and 93.

The computer 25 also has data and select lines 100 and 101 communicating with a pair of conventional type MCS 6520 peripheral interface adapters (PIA's) 102 and 103 which cooperate with conventional input and output multiplexers 104 and 105, respectively, to handle inputs to and outputs from the computer 25.

To this end, thirteen of the sixteen terminals comprising the A and B ports of the PIA 102 are connected through the lines 106 and the multiplexer 104 to receive, selectively, switch position representative input signals from the control panel switches over the lines 107 and 108, thumbwheel setting representative input signals over the lines 109, and an over temperature input signal from a sensor 110 in the mixer 16 over the line 111.

One bit is required for indicating the condition of each of the switches on the panel 67 (FIG. 3) and the switches are divided into two groups as shown in FIG. 1a. A four bit binary code may be used to define the setting of each wheel on the thumbwheel switches 69 and 70 on the panel 67, in which case thirteen bits and twelve bits, respectively, are required to represent the settings of the thumbwheel switches 69 and 70. The condition of the over temperature sensor 110 can be represented by one bit.

Selection of an input to the multiplexer 104 for transmission to the computer 25 is effected by signals from three bits of the B port of the PIA 103 which are supplied to the multiplexer 104 over the lines 112 and 113. A strobe pulse supplied to the multiplexer 104 over the line 114 enables a selected input to present its data to the PIA 102 for reading by the computer 25 in the known manner.

The output multiplexer 105 has lines 115 connected to the four power word latches 48, lines 116 connected to the ten master motor speed control latches 37a, and lines 117 connected to the ten slave motor speed control latches 36a. It also has lines 118 connected to sixteen master display latches 119, lines 120 connected to sixteen slave display latches 121 and lines 122 connected to sixteen panel lamp latches 123.

The sixteen master display latches 119 are connected to sixteen decoders and drivers 124 which control the display on the LED display device 71 on the control panel. Similarly, the sixteen slave display latches 121 are connected to sixteen decoders and drivers 125 which control the LED display device 73 (FIG. 3). The sixteen panel lamp latches 123 are connected to conventional lamp drivers 126 which control the illumination of the legends on the several switches and indicators 72, 74, 75, 76, and 78 through 83 on the control panel 67.

The selection of one of the six groups of output device latches to receive an output from the computer 25 through the sixteen terminals of the A and B ports of the PIA 103, the lines 127 and the multiplexer 106 is made by signals from the three select bits of the B port of the PIA 103 which are supplied to the multiplexer 105 over the lines 112. Enablement of the selected output device latches to receive output data from the computer 25 through the PIA 103 is effected in the known manner by a strobe pulse supplied to the multiplexer 105 over the line 128.

Operation

In the industry, typically the isocyanate component is a specified percentage of the polyol component. Accordingly, the mixing apparatus will be described below as operating in the "%" mode, i.e., with the panel switch 76 (FIG. 3) in the "%" position. In this mode, the polyol and isocyanate channels function as master and slave channels, respectively.

Figure 4:
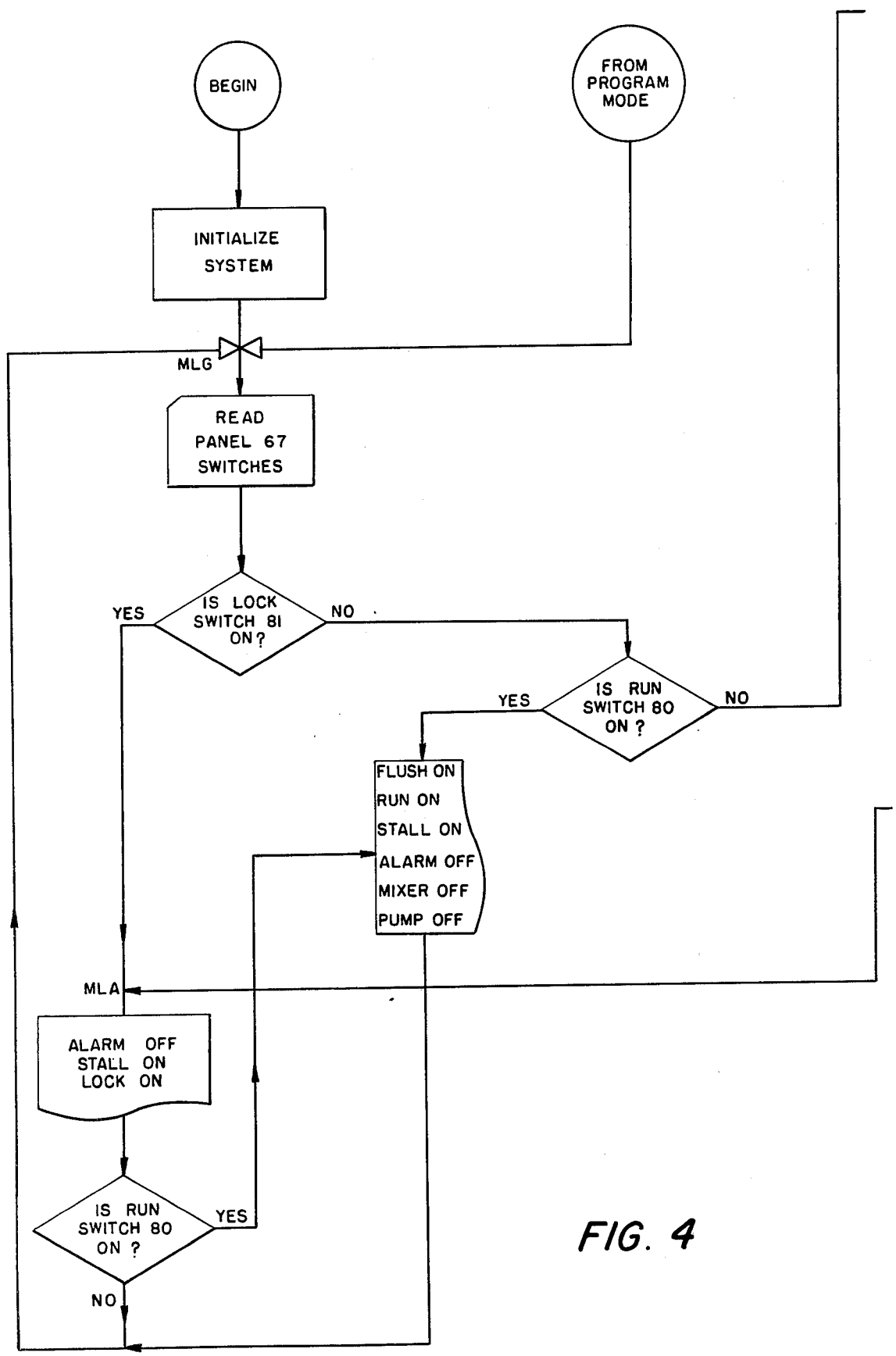
FIGS. 4, 4A and 4B illustrate the "Begin Sequence" program for the mixing apparatus of FIGS. 1a and 1b.
Figure 4A:
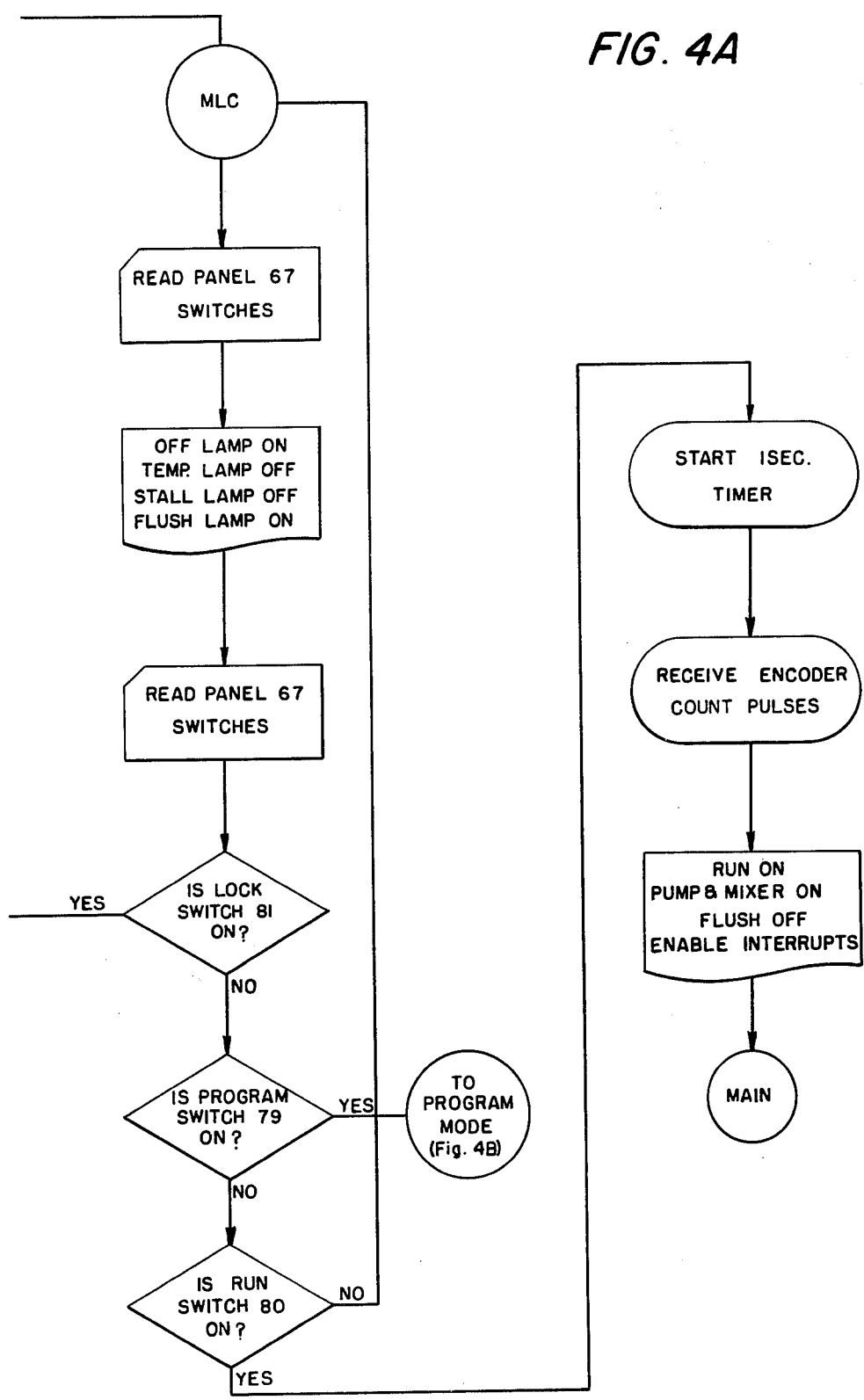
Figure 4B:
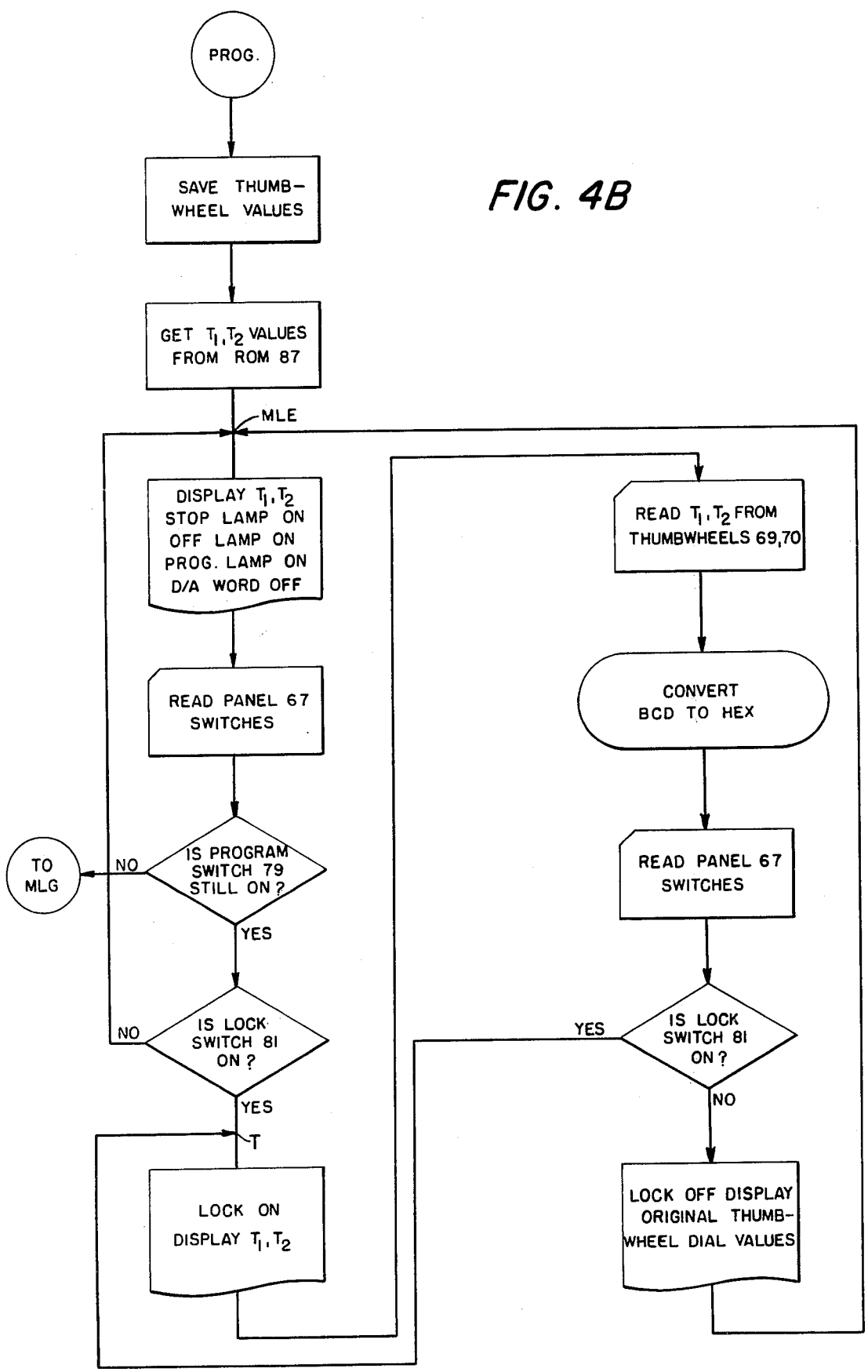

When the system is first started up by actuation of the on-off switch 78 (FIG. 3) (or when the key reset switch 77 is actuated), the system goes into a "BEGIN" program sequence outlined in FIGS. 4, 4A and 4B. This quickly brings the system to the running condition, at which time the "MAIN PROGRAM" shown in FIGS. 6, 6A and 6B assumes control. During operation under the "MAIN PROGRAM," interrupts are serviced as indicated by the "INTERRUPT" program sequence depicted in FIGS. 6 and 6A. These programs are all contained in the ROM 87 (FIG. 1a). Operation of the system in executing the several control program sequences is described briefly below.

The "BEGIN" Sequence

Referring to FIG. 4, the "BEGIN" program sequence is initiated automatically either when the "POWER" switch 78 (FIG. 3) is turned on or when the key reset switch 77 is actuated. This disables all interrupts so that the computer will not receive any inputs from the encoders 23 and 24, should one of them be moving. Also, the power words supplied to the power word latches and to the master and slave pump motor speed control latches 37a and 36a (FIG. 1a) are cleared so that the pumps and the mixer will not move when the power is first turned on but will be at rest. The computer 25 then initializes a series of registers in the RAM 91 and puts certain flags that are used throughout the program in their correct initial positions.

The computer 25 (FIG. 1a) then reads the positions of all of the switches on the control panel 67. Next, the computer determines whether the "LOCK" switch 81 (FIG. 3) has been actuated. If so, the program proceeds to the point MLA (FIG. 4) and causes certain conditions of the power word to be set up; the "LOCK" switch to be illuminated; a determination to be made that the alarm 66 (FIG. 3) is turned off; and the "STALL" indicator to be turned on.

The computer then determines that the "RUN" switch 80 (FIG. 3) is off and returns to the point MLG (FIG. 4).

If the "LOCK" switch 81 and the "RUN" switch 80 are both off, the program will go to MLC (FIG. 4A) and cause the computer to read the positions of the panel switches (FIG. 3), output the switch position readings to the switch display latches 123 (FIG. 1a), again read the switch positions and, if the "PROGRAM" switch 79 is off, return to MLC and repeat the instructions in that loop.

The sequence of events described above will repeat until the operator actuates the "PROGRAM" switch 79 (FIG. 3) to enable him to set into the computer the desired time intervals for operation of the system before and in the "FLUSH" mode after the occurrence of a malfunction. When this happens, the computer goes into the "PROGRAM" mode, a flow diagram of which is shown in FIG. 4B.

The first action directed by the "PROGRAM" subroutine is for the computer 25 to fetch the values set into the master and slave thumbwheel switches 69 and 70, respectively (FIG. 3), by the operator and load them into the RAM 91 (FIG. 1a). At the same time, the computer is caused to read the ROM 87 to see what values it contains for the timer registers T1 and T2. In the event that the operator fails to program the timer registers T1 and T2, the computer will automatically load into both registers the value 30 seconds.

The data word for the master and slave pump speed control latches 36a and 37a is zeroed out; the "STOP" light, the "FLUSH/OFF" light and the "PROGRAM" lights on the switches 80, 82 and 79 (FIG. 3), respectively, are on; and the computer exhibits this information on the control panel 67. The settings of the panel switches are now read again and, if the "PROGRAM" switch 79 is still on, the computer 25 determines if the "LOCK" switch 81 (FIG. 3) has been turned on, in which event it turns the "LOCK" lamp on and outputs the T1, T2 data word at this point.

The computer 25 then reads the binary coded decimal values of T1 and T2, converts them to hexidecimal values, and again reads the positions of the switches on the panel 67 (FIG. 3).

The computer 25 then determines if the "LOCK" switch 81 (FIG. 3) is on or off. If it is on, the computer loops back to the program location T in FIG. 4B and continues to execute the loop previously described until the "LOCK" switch 81 is turned off.

As soon as the "LOCK" switch 81 is turned off and its position has been read by the computer, the "LOCK" lamp is turned off and the data word indicating that fact is generated. The set-in master and slave flow rates values that were previously stored in the RAM 91 (FIG. 1a) are then printed out on the master and slave displays 71 and 73 (FIG. 3,) respectively. The computer then returns to the point MLE at the top of FIG. 4B and repeats the program until the "PROGRAM" switch 79 has been turned off, at which time it goes back to the point MLG in FIG. 4.

The computer then reads the positions of the panel switches again and, if the "RUN" switch 80 (FIG. 3) is on, but the "LOCK" switch 81 is not, it acknowledges the fact that the "RUN" switch is on and zeros the data word to indicate this fact. It also indicates the "STALL" condition as being on, and sets up "FLUSH" in the on condition. The program then loops back to the point MLG (FIG. 4) and, if both the "LOCK" switch 81 and the "RUN" switch 80 are off, it advances to the point MLC (FIG. 4B) for the last time. In this branch, the computer again reads all of the panel switch positions, displays the switch position information, reads the switches again and determines whether the "LOCK" switch 81 is on or off.

If the "LOCK" switch 81 is off, the computer is caused to determine if the system is in the "PROGRAM" mode, and if not, it again reads the "RUN" switch 80. If the "RUN" switch 80 is on for the first time at this particular point, the computer 25 is then caused to start the timer in the PIA 97 (FIG. 1a) which counts pulses from the 1 Mhz/sec. clock in the computer to produce successive one second interrupts. The "RUN" light is illuminated, the pump and mixer motors are turned on, and the computer is enabled to service interrupts and goes into the main program outlined in FIGS. 6, 6A and 6B.

The Main Program

The computer updates itself once a second. To this end, interrupts are produced by the PIA 97 (FIG. 1a) at one second intervals by counting down pulses from the computer program counter clock which is crystal controlled to a frequency of 1 Mhz/sec. In addition, the computer services interrupts from the encoders 23 and 24 (FIG. 1b) which occur typically at the rate of about 2500 per second from the four encoder channels.

Upon receipt of an interrupt during the course of the main program, the computer stops what it is then doing and determines the source of the interrupt (e.g., the encoder 23, the encoder 24, or the timer 97). That done, it puts the data received into the respective register in the RAM 91 (FIG. 1a), clears the interrupt away from the peripheral device, and goes back to where it was in the main program.

In the time interval between successive one second pulses, the computer 25 receives encoded flow representative pulses from two of the encoder channels and puts them into counter registers in the RAM 91; it scans the settings of the thumbwheels 69 and 70 and the switches on the control panel 67 (FIG. 3); and it updates the panel displays and outputs prior flow calculations on the panel, in addition to making numerous decisions in connection with the operation of the system as described below.

The computer 25 is also arranged to "normalize" the pulse output from the encoder 24 which, for any given constant flow rate, is modulated as a function of the periodically varying output shaft speed of the flow meter 22. To this end, the ROM 87 contains tables of compensation numbers, one for each of the 1024 pulses generated in one revolution of each of the flow meter output shafts, the compensation numbers having values such that, when combined with the respective pulse counts to correct the latter, they compensate for any unwanted pulse modulation. The index pulses generated by the encoder 24 are used in the computer to synchronize the compensation table with the incoming flow rate representing pulses.

Assuming that the computer accumulates pulses from the encoders 23 and 24 during a given one second interval, at the end of the interval it counts the number of accumulated pulses. It next looks at the settings of the thumbwheels 69 and 70, ascertains the dialed-in flow rate settings, which are binary coded decimal numbers representing selected flow rates in pounds per minute; it goes through a multiply routine which converts the set-in flow rates in pounds per minute to pulses per second (based on the knowledge that in one revolution of a flow meter a known fluid displacement occurs and 1024 pulses are produced); and then it subtracts the counts actually received from the encoders from the equivalent counts derived from the thumb wheel settings.

If the results of the subtractions are zero, then the actual flow rates match the actual flow rates set into the thumb wheels.

A positive difference indicates that the actual encoder count for that channel is greater than the converted thumb wheel value so that the flow rate is faster than the set-in value. In such cases, if the system is set to display in the ERROR" mode, the amount of the error will be displayed on the front panel 67 (FIG. 3).

Knowing the actual absolute magnitude of the error and its direction, the computer enters a sub-routine to determine whether the error is of sufficient magnitude to warrant making a large correction or, on the contrary, is close to the solution and therefore requires only a small correction, the dividing line between the two being, say, a flow rate of one pound per minute.

If the flow rate error is one pound per minute or less, the computer enters a "Null Servo" routine in which a constant is selected from memory and multiplied by the flow rate error to produce a new number of opposite (negative) sign which is used to control the pump motors. Desirably the new number should slow the pump down without causing the system to jump out of the "Null Servo" range, i.e., it should "walk" it towards an "Anti Hunt" range of, say, plus or minus 1/10th of a pound per minute. For example, if the error has been reduced to 6/10ths of a pound per minute and the "Anti Hunt" range is 1/10th of a pound per minute, the correction factor should be a number small enough that the maximum error value in the "Null Servo" range (less than 1, say 0.9) multiplied by such number will not produce a new number so large as to cause the system to over-shoot the Anti Hunt" range. This is a fine control adjustment and it will take only five or six correction cycles to bring the actual flow rate into the "Anti Hunt" range.

On the other hand, if the subtraction of the actual encoder counts from the equivalent counts derived from the thumb wheel setting is a large number, say 15 pounds per minute, the computer enters an "Exponential Approach" subroutine which calculates an error multiplier equal to a constant multiplied by an exponential function of the error, so that the larger the error, the greater the correction will be. Preferably, the correction should be slightly more than half the actual error. In other words, if the flow rate error is, say, 15 pounds per minute, the correction number will be slightly above 7 pounds per minute so that the pump motors will immediately accelerate rapidly. This is a coarse control adjustment. Successive determinations of the error will continue in this fashion until the error is rapidly brought into the range where the computer will enter the "Null Servo" routine described above, which will eventually bring the error down into the "Anti Hunt" range.

Operation of the apparatus in the manner described above is effected by the "Main Program" outlined in FIGS. 6, 6A and 6B, which will be self-explanatory.

The first steps to be executed by the computer 25, as directed by the "MAIN" program, are to read the panel switches, and to read the temperature bit as derived from the output of the temperature sensor 110 (FIG. 1a) in the mixer 16 (FIG. 1b), to determine whether or not the temperature bit is set, indicating that a specified temperature upper limit in the mixer has been exceeded continuously for a specified period of time. If the determination is negative, the computer is caused to clear a register in the RAM 91, to reset it for the specified time interval, and to proceed with the program.

On the other hand, if the excessive temperature continues to be detected for the specified period, then the computer 25 initiates action to light the "TEMP." Indicator 84 on the control panel 67 (FIG. 3), to set up a potential "Stall" situation for later evaluation and ultimately a shut down sequence.

The computer then determines if the "STOP" switch 80 (FIG. 3) is set and, if so, it sets up a stop sequence. If not, it clears the stop sequence. In either case, it then determines if the "LOCK" switch 81 is on or off.

In the event the "LOCK" switch 81 is not on, the program causes the computer 25 to read the master thumbwheel switch 69 and to convert the wheel readings from binary coded decimal values to hexadecimal values. The program then directs the computer to read all of the switches on the panel 67 and to determine whether the thumbwheel switch 70 is in the "%" or the "FLOW" condition. Since it is in the "%" mode, the computer performs a decimal multiplication of the flow rate value set into the slave thumbwheel switch 70 and saves the product as the flow rate desired for the slave channel.

The computer now fetches the binary coded decimal numbers stored in the RAM 91 corresponding to the settings of the thumbwheels 69 and 70 and converts them to hexadecimal numbers (FIG. 6A). The computer 25 then determines whether the switch 72 (FIG. 3) is in the "ERROR" position or in the "FLOW" position. In the case of the former, the computer follows the left-hand program branch in FIG. 6A and causes the "FLOW" lamp on the switch 72 to be turned off and the "ERROR" lamp to be turned on, the converted thumbwheel setting values to be subtracted from the master pulses from the encoder 24 and the results to be converted to decimal values which are displayed on the master LED display device 71 (FIG. 3). If the switch 72 is in the "FLOW" position, the computer follows the right-hand branch and simply causes the "ERROR" switch lamp to be turned off, the "FLOW" switch lamp to be turned on, and the actual flow to be displayed on the LED display device 71.

Continuing with the program (FIG. 6B), the computer now reads the position of the "TOTAL FLOW" switch 75. If the switch 75 is in the "TOTAL FLOW" position, the computer 25 follows the left-hand branch and acts to fetch the value of the actual polyol flow rate, which has been stored in temporary memory in the RAM 91 (FIG. 1a), add it to the value of the actual isocyanate flow rate at this time, and display the sum of the two in the LED display device 73 (FIG. 3) as the total flow.

If the switch 75 is not in the "TOTAL FLOW" position, the computer 25 follows the right-hand program branch (FIG. 6B) which causes it to look at the switch 74 to determine whether it is set in the "ERROR" or the "FLOW" mode. It not, it prints out the condition of the slave switch 74. If so, it prints out the condition of the switch 74, subtracts the actual slave flow from the converted thumbwheel value, saves the difference, determines the sign of the answer, and converts it to a decimal value for display.

In either case, the program then directs the computer 25 to cause the actual error or flow rate output to be fed to the proper LED display device 73, the display word to be printed and the power word to be printed to control the apparatus. The program then returns to the beginning of the main program sequence (FIG. 6) and continues to repeat this sequence over and over, reading all of the switch positions and making the necessary decisions as described above.

The "Interrupt Sequence" Subroutine

The system having previously been enabled to receive and service interrupts, the computer 25 now responds to interrupts as they occur as directed by the "Interrupt Sequence" program set out in FIGS. 5 and 5A.

Interrupts may be from any one of five sources, viz. the two indexing signals and two trains of flow rate representative signals from the encoders 23 and 24 and the one second signal from the timer PIA 97. In operation, the serial data coming from the encoders 23 and 24 is fed to four input ports in the PIA 94, one for each of the four channels. When a port receives a signal, it goes from a high state to a low state and produces an output which will place the interrupt line 93 into the computer 25 in the low state. That output is OR'ed with all of the other like outputs (four from the PIA 94 and one from the PIA 97). The change of state of the interrupt line 93 from high to low initiates action of the computer 25 to scan the PIA's 94 and 97 to determine which of the five inputs caused the interrupt. The computer reads the data from that input and automatically clears the interrupt.

If one of the other inputs is also calling for an interrupt, the main interrupt line may still be low, in which case the computer will continue to service the interrupts until they have all been read and cleared away. It will then revert to the main program until the next interrupt occurs.

This technique for handling interrupts is described in greater detail in an article entitled "Interrupt Handler," Byte, Nov. 1977, p. 73 et seq.

Referring now to FIG. 5, the program first causes the computer to put certain working constants into temporary memory in the RAM 91 (FIG. 1a) so that, upon completion of an interrupt servicing routine, it can return to the place where it left the main program to continue execution of the latter. The computer 25 then is caused to initiate a series of tests to determine whether or not index or count signals have been received from either of the encoders 23 and 24 (FIG. 1b). If so, the interrupt is detected and acknowledged, the identity of the source is determined, and the interrupt is serviced as described above, following which the program branches to the "Test Time" subroutine (FIG. 5A).

The "Test Time" subroutine causes the computer 25 to act to determine whether or not the timer PIA 97 (FIG. 1a) has produced an interrupt, which it will do at one second intervals. If it has not, the program initiates action by the computer to unsave the constants that were previously saved, following which it leaves the "Interrupt Sequence" altogether and goes back to the point where it previously left the main program and continues executing the main program.

Figure 5G:
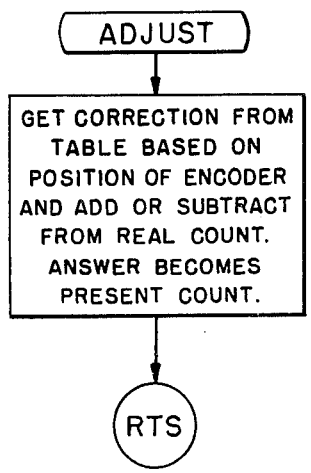
Figure 5F:
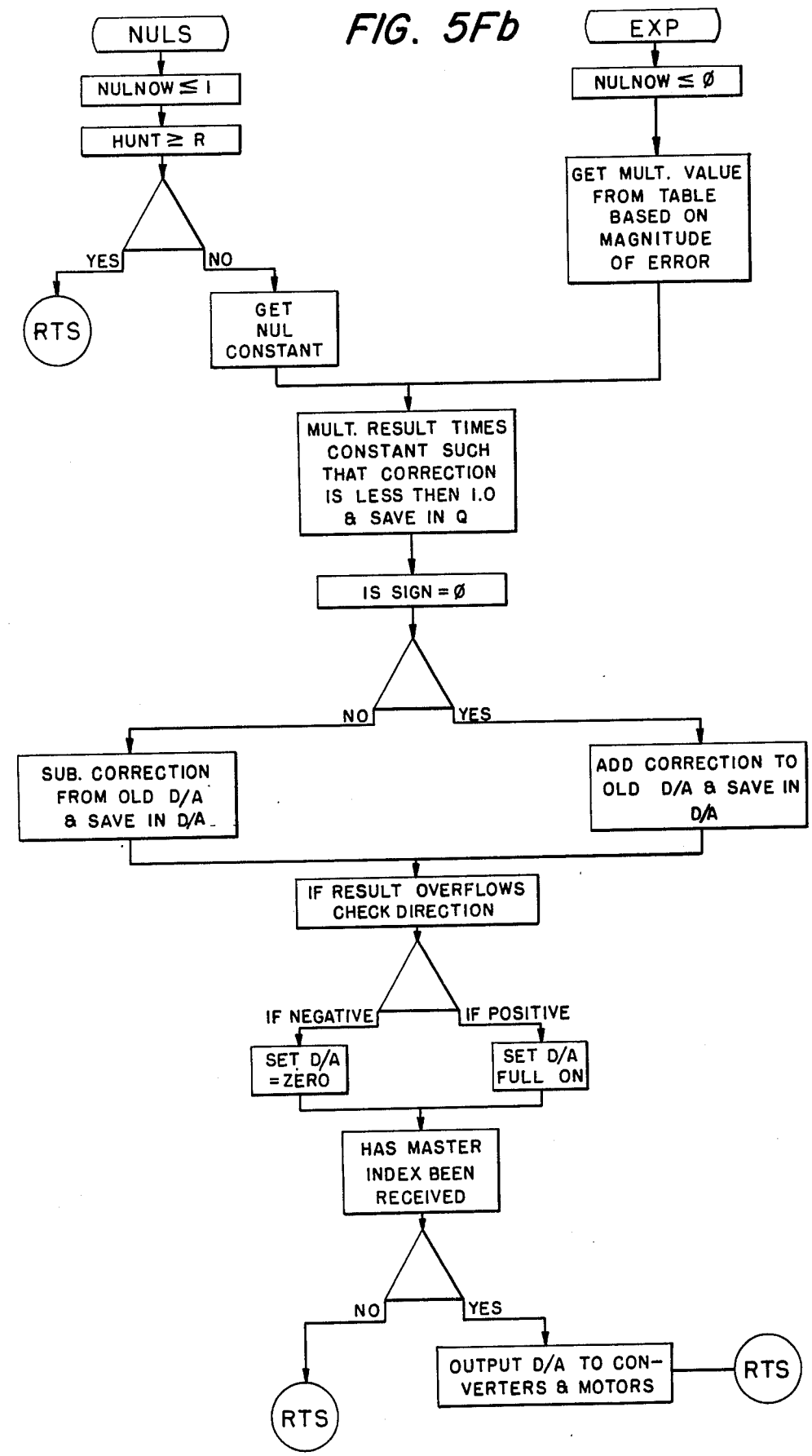

When an interrupt is caused by a one second signal from the timer PIA 97, the computer 25 follows the right-hand branch of the "Test Time" subroutine (FIG. 5A) and executes the operations there specified. Thus, at the end of each one second interval, the program will initiate action by the computer 25 to calculate new flow rates in accordance with the program subroutine outlined in FIG. 5J, based on the number of pulses from each encoder accumulated in one second corrected by a factor calculated according to the program subroutine, shown in FIG. 5G, and based on tables of normalization values contained in the ROM 87. The new flow rate data is substituted for the old flow data recorded in the RAM 91, utilized in the Flow Rate Control subroutine FLC (FIGS. 5Fa and 5Fb) to control the flow rates, and made available for display in the main program.

Figure 5H:
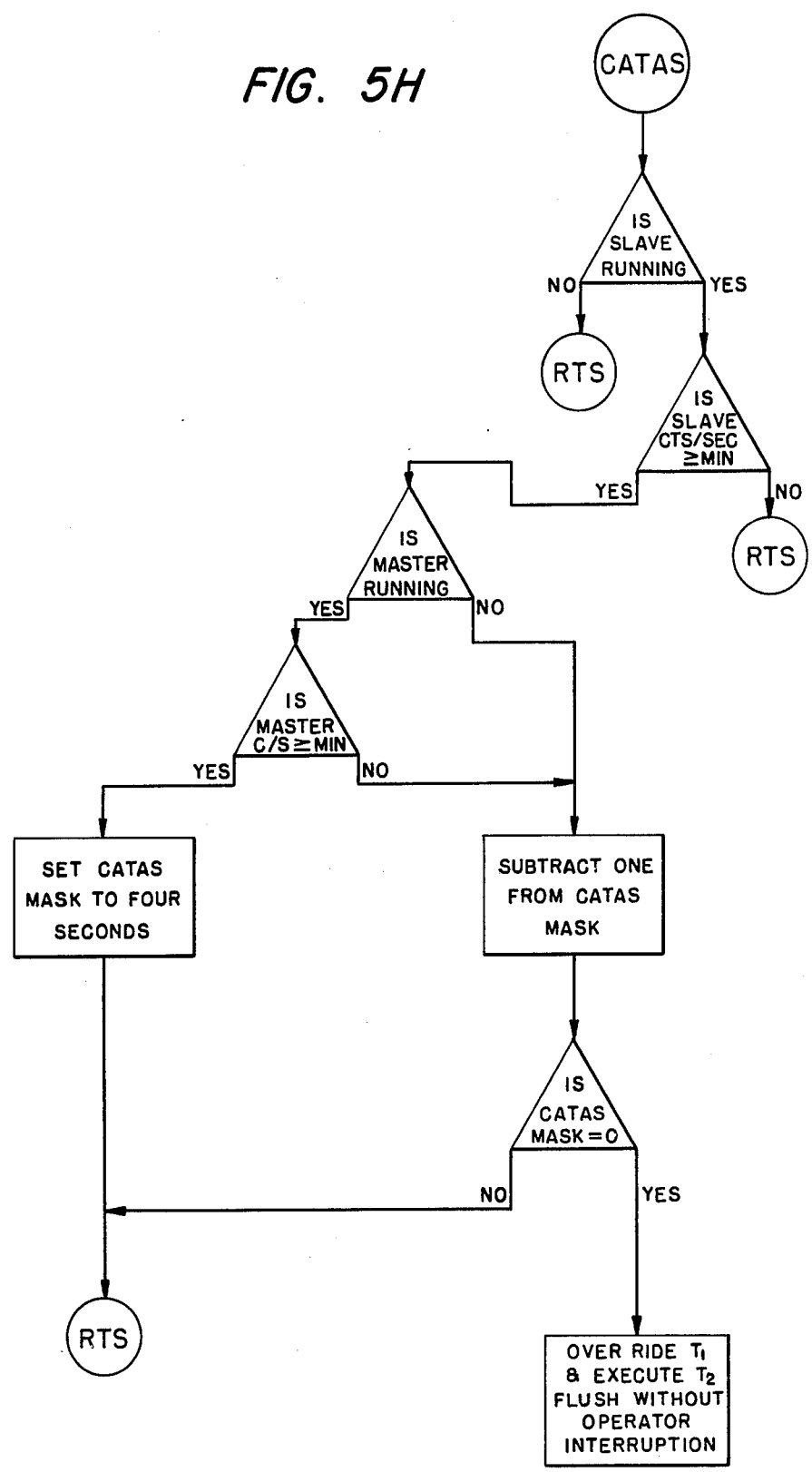

The program also initiates action by the computer 25 to determine the system status and control its operation in accordance with the "Conditions" subroutine shown in FIGS. 5D and 5E, the "Stop Sequence Timer" routine shown in FIGS. 5B and 5C, and the "Catastrophe" routine shown in FIG. 5H. All steps in the "Conditions" subroutine in FIGS. 5D and 5E apply to both channels. Two passes are made, the first time for the master channel and then for the slave channel.

Briefly, the "Conditions" program subroutine initiates action by the computer 25 to determine whether desired operating conditions prevail in the system and, if not, to initiate appropriate remedial action. For example, the computer ascertains whether the master and slave pumps produce preselected flow levels within a predetermined time after start-up and, if not, acts to shut down the system and display on the panel 67 a diagnostic indication of that fact. It also senses any abnormal deviation between actual flow rates and the desired flow rates set into the thumbwheel switches 69 and 70 and initiates action to sound an alarm, to set up a diagnostic indication of that fact on the panel 67, and to bring the "Stop Sequence Timer" routine into operation.

The "Stop Sequence Timer" routine comes into play when some malfunction requiring remedial action occurs. In such event, it initiates action by the computer 25 to sound the alarm horn 66, to produce a diagnostic display of the problem on the panel 67, and to defer initiation of the "Flush" sequence for a preset time interval T1 before initiating the "Flush" sequence, except in the case of a catastrophic malfunction, such as loss of the polyol component while the isocyanate component is still flowing. In the latter event, the "Flush" sequence is initiated immediately and continues for a preset time T2 before shutdown.

Servicing of the one second interrupts from the timer PIA 97 thus includes determining whether the flows of the two components are the same or greater or less than they were during the previous second, updating all the displays on the control panel 67, reading the positions of all the panel switches, determining the mode in which the system is operating, and making all the necessary decisions for increasing or decreasing the speed of the pumps to servo the system back to the values set into the thumb wheel switches 69 and 70, or for instituting appropriate remedial action in case of any malfunction. When this is all done, the previously stacked values are unstacked and the processor reverts to what it was doing in the main program prior to the time the interrupt was received and continues thereafter in the main program.

Shutdown

Malfunctions of the system may take several different forms requiring that different remedial actions be taken. For example, failure or starvation of the pumps supplying the isocyanate and polyol ingredients to the mixer for any reason may be only inconvenient or catastrophic depending on which of the pumps is at fault. If the isocyanate pump fails but the polyol pump remains running so that the volume of the polyol is much higher than that of the reactant, there is little likelihood of serious damage and the system can be shut down at will for repairs.

In such case, as soon as the isocyanate flow rate drops to the point where a specified error value is exceeded, the computer 25 (FIG. 1a) in response to the program subroutines outlined in FIGS. 5B and 5C initiates action to warn the operator of the malfunction. Thus, the horn 66 (FIG. 3) is energized and if the switch 74 is in the error mode, the "ERROR" light begins to blink. If the switch 74 is in the flow mode, the "FLOW" light is extinguished and the "ERROR" light is turned on and caused to blink in the known manner. Simultaneously, the computer 25 measures off the time value T1 previously set into a register in the RAM 91 for the time delay between the occurrence of a malfunction and initiation of the "FLUSH" sequence. During the interval T1, the error may correct itself or the operator may take steps to correct it. If not, at the end of the time T1 the computer causes the system to go into the "FLUSH" routine described below.

On the other hand, if the polyol pump fails and the isocyanate pump continues running, there will quickly be a violent reaction in the mixing head which may damage the latter irreparably and require its replacement at very great expense. Accordingly, in the event of a malfunction of this kind, as soon as the flow in the polyol line drops below a minimum value, the condition is considered as potentially catastrophic and the system is programmed as outlined in FIGS. 5B and 5H to effect complete shutdown in the following sequence: (1) Stop the pump motor 12 (FIG. 1b), leaving the pump motor 13 and mixer motor 53 running; (2) energize the flush valve 61 to introduce a suitable solvent into the line 15 to the mixer; (3) actuate the solenoid valve 59 to introduce a very large volume of air into the mixer 16 to cause severe turbulence therein; (4) actuate the solenoid valve 62 to divert the dissolved, partially mixed ingredients and solvent from the mixer 16 to a waste bin and dump them into it; (5) at the end of a specified time interval, as determined by the operator, stop the flushing operation; (6) when the flushing operation ceases, shut down the mixer in the normal manner following all customary precautionary procedures.

From the foregoing, it will be apparent that the mixing apparatus of the invention represents a marked advance in the art. The programmed digital computer controlled system employed is free from drift and is capable of operating completely unattended in different modes of operation selectively presettable by an operator. The actual flow rates displayed and utilized for control are instantaneous and not average values, and the system is capable of maintaining the ingredient flow rates to an accuracy of ±0.6%. In addition, the system is totally enclosed and requires no open-loop calibration, a highly desirable feature with materials such as isocyanate which is toxic and violently reactive with moisture in the air.

In the accompanying drawings, the termination of a program branch or subroutine in the symbol "RTS" is intended to denote a return to the point in the program where it entered the branch or subroutine.

The specific apparatus described above is illustrative only, and modifications in form and detail are possible without departing from the spirit of the invention. For example, other suitable types of components such as flow meters, pumps, motors and motor controllers may be used in place of those shown. The invention is intended to encompass all such modifications as fall within the scope of the following claims.

I claim:

1. In fluid control apparatus including a conduit for a fluid and pumping means for impelling fluid along said conduit, the improvement comprising means for generating a sequence of pulses having a repetition rate accurately representative of the actual instantaneous flow rate in said conduit, sampling means for periodically counting the number of said pulses generated per unit of time, means for generating a first signal that is a binary digital representation of the number of counts counted by said sampling means, manually settable means for generating a reference signal value representative of a selected flow rate, means generating a second signal that is a binary digital representation of the setting of said settable means and means jointly responsive to said first and second signals providing a difference signal for controlling said pumping means to maintain a predetermined relation between said pulse repetition rate and said reference value.

2. Fluid flow control apparatus as defined in claim 1 in which the pulse sequence generating means comprises flow meter means in said conduit providing a mechanical output accurately representative of the instantaneous flow rate of the fluid in said conduit with means responsive to said mechanical output for generating a sequence of pulses having a repetition rate accurately representative of the actual instantaneous flow rate in said conduit.

3. Fluid flow control apparatus as defined in claim 2 in which the output of the flow meter means is a shaft rotation representative of the flow rate in said conduit, which shaft rotation embodies an inherent periodic, undesired velocity modulation during each revolution, whereby the repetition rate of the pulses generated in response to said shaft rotation is correspondingly modulated, together with means for generating correction values to compensate for said undesired frequency modulation.

4. Fluid flow control apparatus as defined in claim 3 together with means providing an index pulse once each revolution in said shaft rotation, together with information storage means for storing a table of correction values to compensate for the inherent periodic velocity modulation of the flow meter shaft rotation, means jointly responsive to said index pulses and to said information storage means for synchronizing the pulses generated in response to the flow meter shaft rotation with the correction values stored in the information storage means, and means jointly responsive to the flow rate representative pulses and to the information storage means for applying corrections to the former to compensate for the inherent velocity modulation of the flow meter shaft rotation.

5. Fluid flow control apparatus as defined in claim 2 in which the output of the flow meter means is a shaft rotation that is representative of the flow rate in said conduit and the pulse generating means comprises a radiant energy source, a photosensitive device disposed to receive radiant energy from the source, and a disc connected to receive said shaft rotation and carrying a plurality of uniformly spaced indicia thereon, said disc being disposed to interrupt radiant energy passing from said source to said photosensitive device.

6. Fluid flow control apparatus as defined in claim 1 together with means for determining if the difference signal is smaller or larger than a predetermined value, means rendered operative for difference signals smaller than the predetermined value for effecting one form of control of said pumping means at a given rate, and means rendered operative for difference signals larger than the predetermined value for effecting a different form of control of said pumping means at a greater rate.

7. Fluid flow control apparatus according to claim 6 in which, for difference signals smaller than the predetermined value, the pumping means is controlled to effect small increments of change in fluid flow rate and, for difference signals greater than the predetermined value, the pumping means is controlled in accordance with an exponential function of the difference signal.

8. In continuous automatic mixing apparatus including a mixer and adjustable flow rate pumping means for feeding at least one ingredient through a conduit to said mixer, the improvement comprising means generating a sequence of pulses having a repetition rate accurately representative of the actual instantaneous rate of flow of said ingredient, sampling means for periodically counting the number of said pulses generated per unit of time, means for generating a first signal that is a digital representation of the number of pulses counted by said sampling means, manually settable means for generating a reference signal value representative of a desired flow rate for said one ingredient, means for generating a second signal that is a digital representation of the setting of said settable means, and means for subtracting said second and third signals to provide a difference signal for controlling said pumping means to maintain a predetermined relation between said actual flow rate and said desired flow rate.

9. Mixing apparatus as defined in claim 8 together with digital signal information exhibiting means, and means operable selectively to connect the exhibiting means to exhibit information representing said second signal or information representing said difference signal.

10. Mixing apparatus as defined in claim 9 together with second adjustable flow rate pumping means for feeding a second ingredient through a second conduit to said mixer, second means for generating a second sequence of pulses having a repetition rate accurately representative of the actual instantaneous rate of flow of said second ingredient, second sampling means for periodically counting the number of said second sequence of pulses generated per unit of time, second manually settable means for generating a second reference value representative of a desired flow rate for said second ingredient, means for generating a fourth signal that is a digital representation of the number of counts counted by said second sampling means, means for generating a fifth signal that is a digital representation of the setting of said manually settable means, and means for subtracting said fourth and fifth signals to provide a second difference signal for controlling said second pumping means.

11. Mixing apparatus as defined in claim 10 together with second digital information exhibiting means, and means operable selectively to connect the second information exhibiting means to exhibit information representing said fourth signal or information representing said second difference signal.

12. Mixing apparatus as defined in claim 11 together with means operable selectively to connect one of said information exhibiting means to exhibit information representing the sum of said second and fourth signals.

13. Mixing apparatus as defined in claim 10 together with means selectively operable to connect said second manually settable means to generate a second reference value representative of a desired flow rate for said second ingredient that is a selected percentage of a desired preset flow rate for the first ingredient.

14. Mixing apparatus as defined in claim 10 in which said first and second manually settable means each includes means for temporary storage of the first and second reference values, respectively, generated thereby, and selectively operable means is provided for connecting said first and second manually resettable means to be resettable to different values while maintaining said third and fifth signal generating means effective to generate third and fifth signals representative, respectively, of said first and second reference values stored in said storage means.

15. Mixing apparatus as defined in claim 14 in which the selectively operable means is actuatable to render said third and fifth signal generating means effective to generate third and fifth signals representative, respectively, of said different reference values.

16. Mixing apparatus as defined in claim 10 together with means rendered operative whenever the pulse count by one of said first and second sampling means drops below a specified value for actuating an alarm and preparing the apparatus for shutdown, and means rendered operative after continued operation of the apparatus under such condition for a predetermined interval of time for effecting shutdown of the apparatus.

17. Mixing apparatus as defined in claim 16 in which said shutdown effecting means includes means for stopping said first and second pumping means, means for introducing a solvent into said mixer for a specified period of time, means for introducing a gas into the mixer to create substantial turbulence therein, means for diverting the output of the mixer to a waste receiver, and means for stopping said mixer at the end of said specified time period.

18. Mixing apparatus as defined in claim 17 in which both said predetermined interval of time and said specified time period are adjustable.

19. Mixing apparatus as defined in claim 8 together with means rendered operative upon detection of an operating malfunction in said mixer for actuating an alarm and preparing the apparatus for shutdown.

20. Mixing apparatus as defined in claim 19 together with means rendered operative a predetermined time after actuation of said alarm for effecting shutdown of the apparatus.

21. Mixing apparatus as defined in claim 20 in which said predetermined time is manually adjustable.

22. Mixing apparatus as defined in claim 20 together with means responsive to detection of a malfunction for providing a diagnostic indication thereof.

23. Mixing apparatus as defined in claim 22 in which the means for actuating an alarm and preparing the apparatus for shutdown is rendered operative upon detection of an excessive temperature in the mixer.

24. Mixing apparatus as defined in claim 20 in which said shutdown effecting means is rendered operative immediately upon detection of a catastrophic malfunction.

25. Mixing apparatus as defined in claim 8 together with means rendered operative upon failure of the sampling means to reach a specified count within a selected time interval after the apparatus is first started for effecting shutdown of the apparatus.

* * * * *